United States Patent [19]

Juvan

[11] Patent Number: 5,037,524
[45] Date of Patent: Aug. 6, 1991

[54] APPARATUS FOR TREATING LIQUIDS WITH HIGH-INTENSITY PRESSURE WAVES

[76] Inventor: Christian H. A. Juvan, 10053 Judy Ave., Cupertino, Calif. 95014

[21] Appl. No.: 503,037

[22] Filed: Apr. 2, 1990

Related U.S. Application Data

[62] Division of Ser. No. 78,655, Jul. 28, 1987, Pat. No. 4,917,785.

[51] Int. Cl.$^5$ ...................... H05B 31/06; B01D 13/02
[52] U.S. Cl. ...................................... 204/307; 204/308
[58] Field of Search ............... 204/164, 304, 305, 308, 204/307; 200/237; 314/34; 315/112

[56] References Cited

U.S. PATENT DOCUMENTS

| | | | |
|---|---|---|---|
| 3,220,873 | 11/1965 | Wesley | 204/164 |
| 4,139,438 | 2/1979 | Fey et al. | 204/164 |
| 4,153,527 | 5/1979 | Greenewald | 204/164 |
| 4,664,767 | 5/1987 | Kudo et al. | 204/164 |
| 4,917,785 | 4/1990 | Juvan | 204/164 |

Primary Examiner—Stephen J. Kalafut
Attorney, Agent, or Firm—Thomas M. Freiburger

[57] ABSTRACT

A method and apparatus are disclosed for efficient endothermic processing of liquids and the precipitation of dissolved elements and chemical compounds. Improvements over prior systems include system layout, components and modes of operation of the system. Applications of the system include destruction of toxic wastes and sewage treatment, precipitation of chemical compounds and elements including metals from solution (brine, sea water, industrial waste), sterilization and water purification, catalytic formation of chemical compounds, and processing of hydrocarbons.

10 Claims, 14 Drawing Sheets

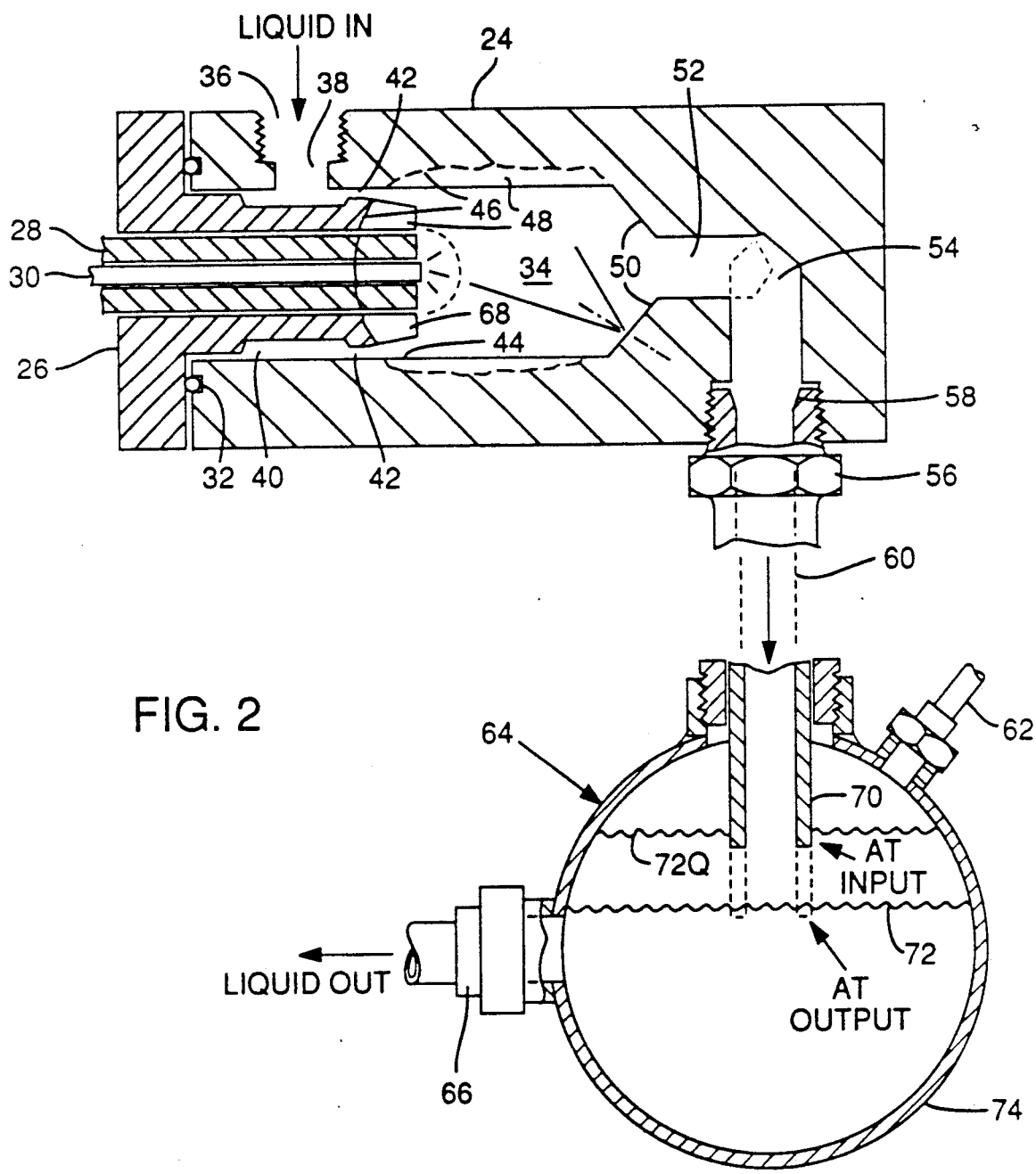

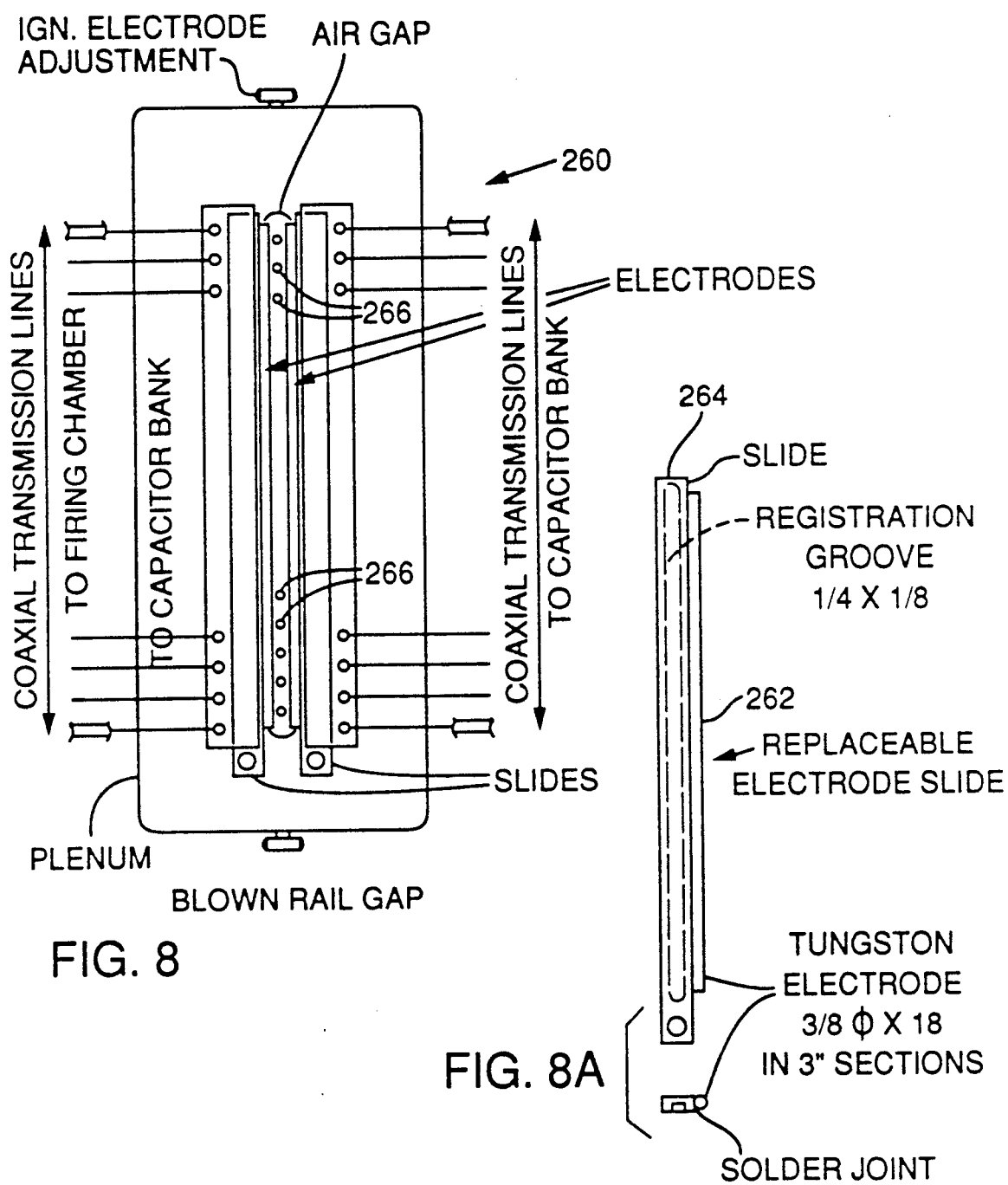

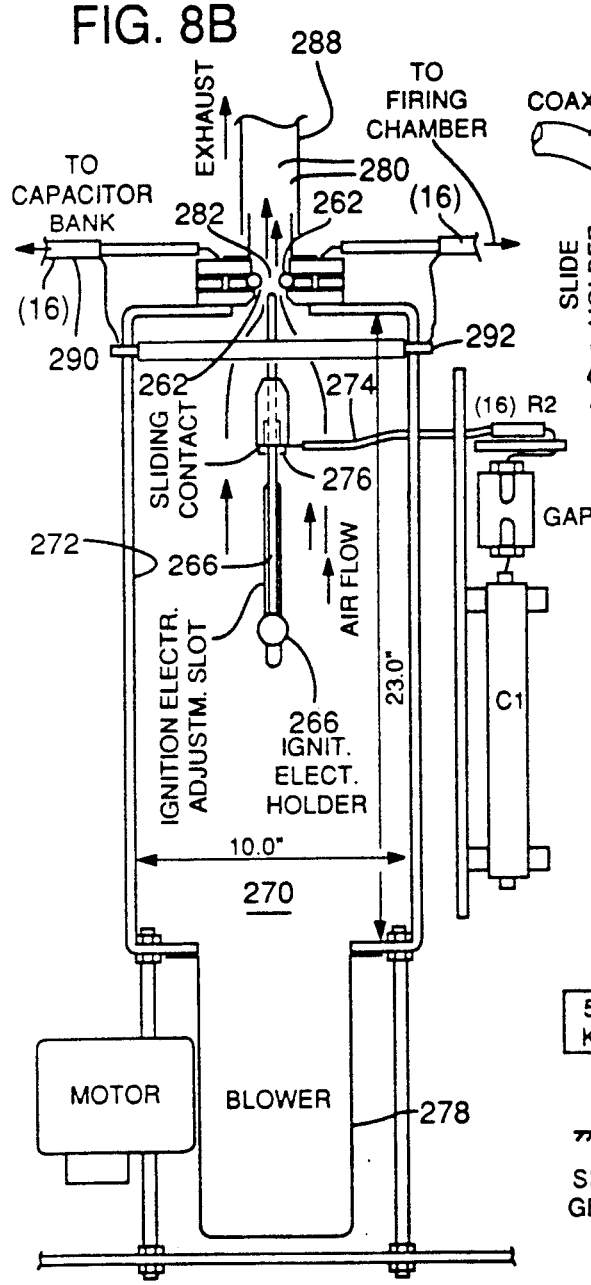
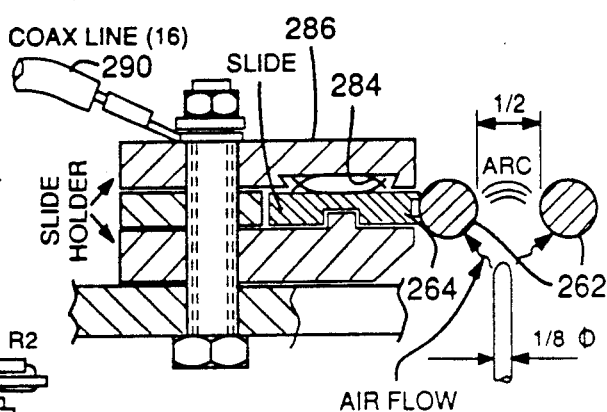

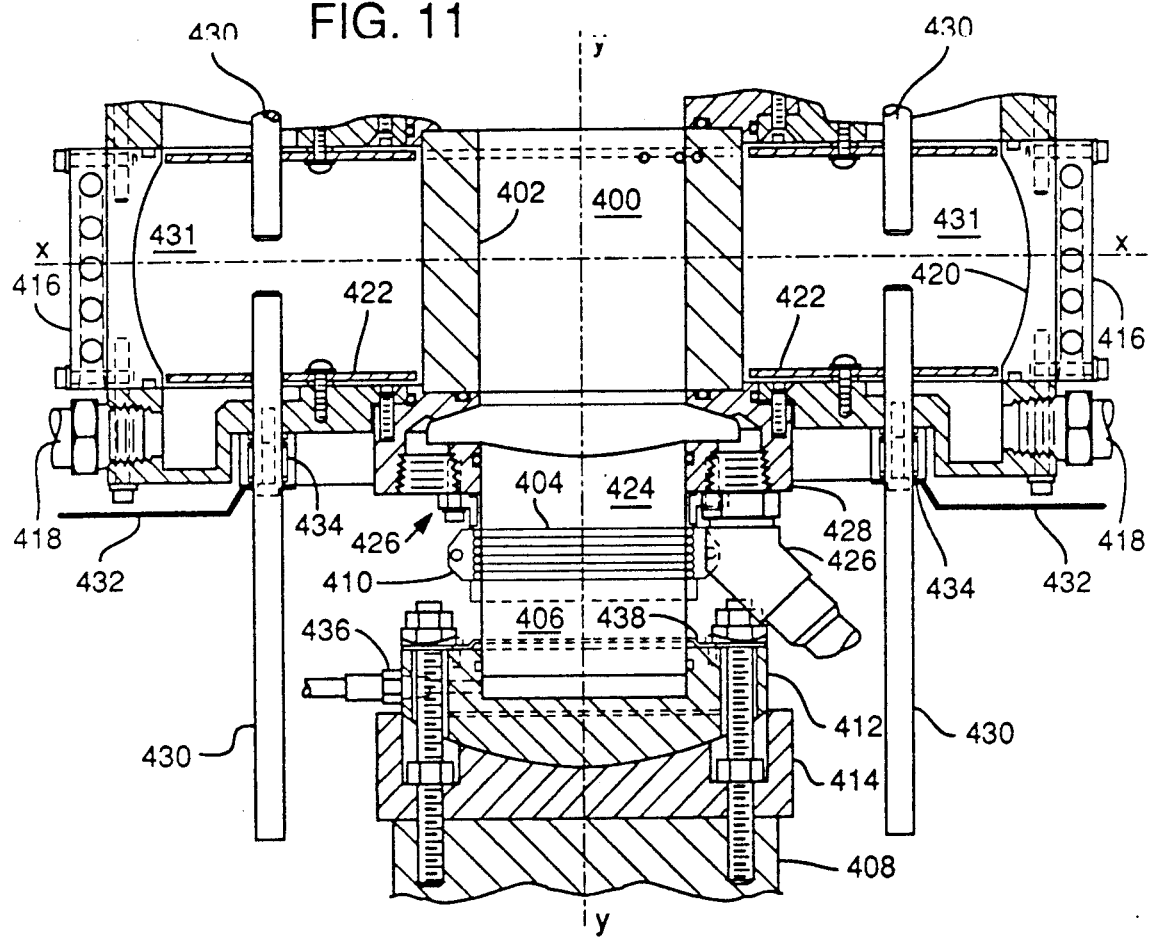

APPARATUS FOR TREATING LIQUIDS WITH HIGH-INTENSITY PRESSURE WAVES

This is a divisional of co-pending application Ser. No. 078,655 filed on July 28, 1987, now U.S. Pat. No. 4,917,785.

BACKGROUND OF THE INVENTION

The invention relates to liquid processing systems, and in particular to a system for endothermic processing of liquids and the precipitation of the dissolved substances from the liquid.

High-energy electrical discharge into a closed liquid volume for the purpose of changing chemical constituents or removing certain elements or compounds from solution has been known, sometimes under the name electro-hydraulics. U.S. Pat. No. 3,220,873 of R. H. Wesley, titled "Coating and Impregnation of Articles by Spark Generated Shock Waves" discusses the removal of constituents from liquids containing chemical compounds. Areas of application disclosed in the patent include plating of an electrode with metal, impregnation of surfaces with desired substances, and the removal of constituents from solutions as precipitates, such as for recovering metals from solution.

The following additional patents also have some relationship to the subject of electro-hydraulics: U.S. Pat. Nos. 3,222,902, 3,232,085, 3,267,710, 3,408,432, 3,456,291, 3,491,010, 3,609,286, 3,644,984, 3,688,535, 3,797,294, 3,857,265 and 4,077,888. These patents are not as pertinent to the subject matter of this invention as is the Wesley patent, most of them dealing with metal forming by electrical discharge.

Previous to the present invention, the use of high-energy electrical discharge into a volume of liquid had not been an efficient and practical tool for recovery of metals and other substances from liquids or slurries, for treatment of waste water, particularly with industrial wastes, for purification of water or other purposes. Previously nearly all work done with electro-hydraulics was experimental, not practical for industrial processes for several reasons. One reason was that in the repeated discharging of a high-energy electrical arc across a gap between electrodes, the electrodes are rather rapidly eroded and burned up. Similarly, switching components are consumed by burn-up. There has not been suggested any practical approach for addressing this problem, and such a substantial down time would have been required with previous systems, for replacing electrodes, insulators and switch elements consumed in the process, that the process was not made economically feasible.

Another problem with the systems suggested in prior patents was that the effect of the sharp shock wave that is sent through the liquid, on the firing chamber and auxiliary systems, was not taken into consideration.

Further problems with prior suggested systems were high self-inductance of electrical circuits and assemblies to the extent that efficiency would be severly reduced, high component cost, particularly replacement components, to the extent of diminishing feasibility, inefficient conduction of power to the electrodes in the firing chamber, and in general a failure to take advantage of the industrial potential of the process.

It is among the objects of the present invention to address these and other short comings of the prior systems, as well as to include further advantageous features which increase the efficiency of this process by a very large factor and make it applicable efficiently to a number of industrial processing applications and including new fields not previously contemplated.

SUMMARY OF THE INVENTION

In a system according to the present invention, liquid processing using a high-energy electrical discharge through a contained volume is performed at very high efficiency, with relatively low component cost, very low down time, relatively low power consumption and low plant cost for a relatively high volume throughput.

In preferred embodiments of the system high-energy discharges are pulsed through successive liquid volumes at a rate of at least once per six seconds, and preferably faster, such as once per second or more frequently.

The firing chamber of the system of the invention is specially configured to attenuate shock waves, and in addition, hydraulic shock absorbers are positioned upstream and downstream of the firing chamber, without rigid flow barriers such as valves.

An important feature of the invention is the construction of the firing chamber assembly, whereby the firing chamber is held together by hydraulic pressure exerted by a piston acting against spring pressure tending to open the assembly. By this construction, the stacked components can be readily disassembled by release of the hydraulic pressure, for quick removal of electrodes, insulators and other consumable components which are subject to eroding and burnup in the process. Additionally, the electrodes and insulators may include a burnup volume, which can be burned away while still allowing the process to function efficiently. In this way, a large sacrificial volume is included on consumable components to increase the service time of the components before they must be replaced.

Another aspect of the invention is electrode feed and insulator sleeve feed, whereby these consumable components are continually fed into the firing chamber during the process, so that the consumed volumes of these components are continually replaced and disassembly is not necessary, eliminating down time. The insulator may actually be extruded by an extruding device, during operation of the system. Alternatively, a special composite may be used in a long-life insulator.

In one embodiment of the invention, a special high efficiency electrode and firing chamber design produces a phenomenon known as plasma compression or theta pinch, for compressing the discharge arc and producing an electromagnetic discharge of shorter wavelengths, which produces better efficiency and more effective breakdown and removal of certain substances from solution.

In some embodiments of the invention, hollow electrodes in opposed configuration in the firing chamber constantly induct a fluid into the firing chamber (to mix with the processed liquid), which cools the electrodes and prolongs their life.

Also in accordance with embodiments of the invention, highly efficient arrangements are included for power conduction to the electrodes and for switching power to the electrodes. If a blown rail gap switch is used, it can include an electrode contact slide. A special switch in accordance with one embodiment of the invention is coaxial, with the electrodes constantly immersed in a gas bath which greatly reduces electrode burnup. The switch assembly has a very low self-inductance, includes some burnup volume for prolonging life, has a cooling means for cooling the switch components, and a special triggering device comprising an ignition electrode with an RF trigger. It can also include an arc blowout feature for self-interruption of the discharge current.

In further aspects of the invention, an assembly of multiple electro-hydraulic units are efficiently banked together in a plant, and a solid-state embodiment of the invention it is disclosed.

Other objects, advantages and features of the invention will be apparent from the following description of a preferred embodiment, considered along with the accompanying drawings.

DESCRIPTION OF THE DRAWINGS

FIG. 2 is a schematic representation of a portion of a system such as may be included in the present invention, including a firing chamber and an external shock absorber, and illustrating construction principles for the firing chamber and adjacent components, for handling the shock wave associated with electro-hydraulic discharge and for handling the burn-up of the electrodes and firing chamber wall during the life of the firing chamber.

FIG. 5 also illustrates the arrangement of components of the firing chamber structure which enable the consumable components to be readily replaced in a minimum of time.

FIG. 6 also illustrates a firing chamber configuration for attenuating shock waves from the plasma discharge.

In FIG. 7 the electrodes are hollow and coolant flows through them for cooling the electrodes and surrounding components, and a special arrangement is shown for conducting power to the electrodes.

FIG. 8 is a top plan view of a form of blown rail gap switch which may be used in accordance with the invention.

FIG. 8A is a view showing a replacement electrode slide for the assembly of FIG. 8.

FIG. 8B is an elevational cross section of the blown rail gap switch of FIG. 8 and associated components.

FIG. 8C is a detailed view showing the electrodes and a contact slide arrangement associated with the blown rail gap assembly shown in FIGS. 8A and 8B.

FIG. 8D is a simplified schematic showing an ignition generator associated with the blown rail gap of the preceding views.

FIG. 11 is a schematic drawing illustrating a transducer activated electro-hydraulic process chamber in accordance with another embodiment of the invention.

DESCRIPTION OF PREFERRED EMBODIMENTS

I. Principle Involved (FIG. 1)

Figure 1:
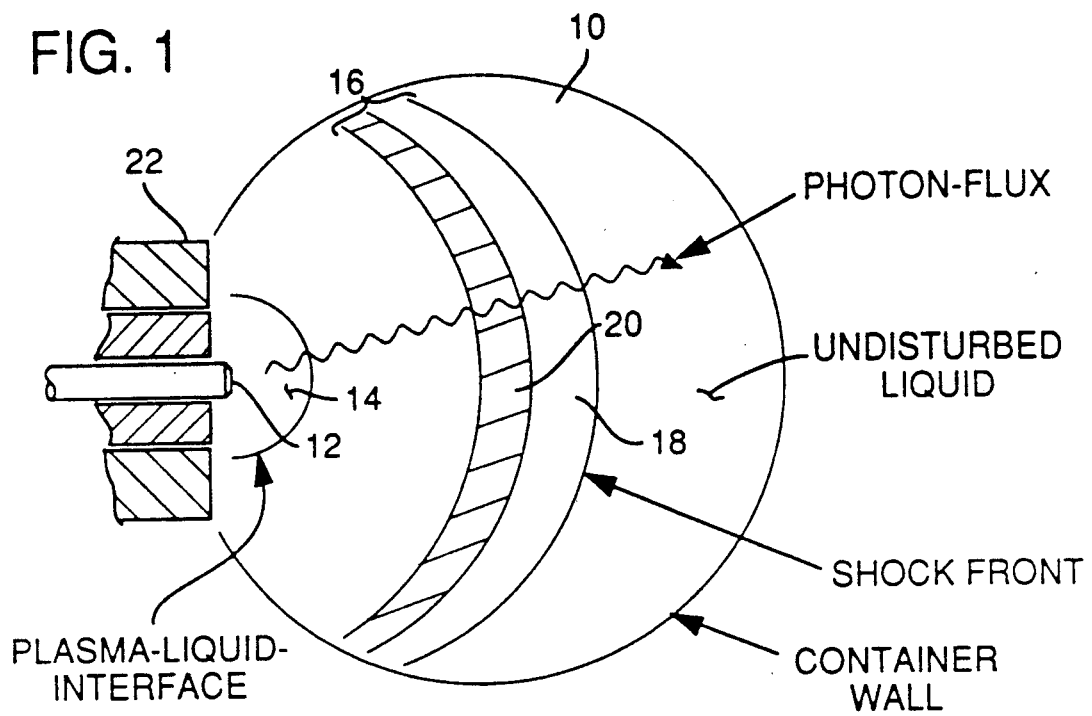
FIG. 1 is a schematic cross sectional view illustrating the physical principles of the electro-hydraulic process.

In the drawings, FIG. 1 illustrates the general principle involved in the system of the invention. The principle is sometimes known as electro-hydraulic.

The electro-hydraulic effect is described in terms of following events in time, starting with the discharge of stored energy into a liquid volume 10 and the space around a center electrode 12 (in the case of a coaxial electrode arrangement as illustrated).

At the moment of the closure of a discharge switch (not shown), the current at the surface of the center electrode 12 begins to heat up the liquid. When the boiling point of the liquid is reached, a blanket of steam starts forming on the electrode surface. Until that time, no pressure increase is generated in the liquid and the energy used so far is lost as far as the desired effects are concerned.

As the steam blanket expands out from the electrode 12, the electrode surface is increasingly insulated from the conducting liquid. This effect is accelerated by the fact that the current is driven (although continuously increasing at this point in time) in a "current driving mode." Therefore, the electrical conduction shifts from the insulated parts of the electrode to areas that are still in contact with the liquid, heating these regions even faster.

When the entire electrode tip is covered by steam, the steam blanket breaks through electrically and the electrical discharge generates a plasma region 14 that becomes heated up very fast by the ionic current. Since the current flows from the electrode against the plasma-liquid interface, more liquid is ionized at that interface due to the ion bombardment and the pressure in that region rises quickly.

The electrical resistance of the plasma is much higher than that of the liquid, and therefore most of the supplied energy is deposited there.

At this point the plasma region is a source of intense light, much of it in the UV region, that irradiates the liquid volume 10 according to the specific radiation-absorption condition of the liquid, the chemical compounds dissolved in it, etc.

The power levels desired are quite high, and can be approximately two gigawatts per liter, and for all practical purposes it can be said that the matter in the entire volume 10 is temporarily ionized at some time or another during the discharge.

As the plasma region 14 expands, it generates a shock wave 16 that propagates through the volume and compresses the liquid in the zone 18 behind it. Depending on the discharge circuit, its timing elements (circuit inductance, storage capacitance, etc.) and the conductive properties of liquid and plasma, part or all of the firing chamber volume is irradiated while the compression takes place; and that process might continue during the propagation of the rarefaction zone 20 following the compression wave.

Since the turbulence in the shocked material is very high, and since the photon flux keeps the material ionized, it is believed that the electrical bonds between the molecules and atoms are canceled, with all chemicals going into the free-ion state.

After the radiation ceases to exist and the plasma cools off, recombination occurs according to chemical reactions possible by the elements present; however, it is observed that nonreactive elements precipitate out not in molecular form but in micron-sized particles. That is thought to be the case because of the turbulence going on while some elements are still partially ionized and therefore electrically positive-charged, while others are temporarily negative-charged by the free electrons present and therefore electrically mutually attracted.

Particles as large as 100 microns have been observed, and the lower limit observed is limited by the resolution of analytical instruments (microscope, particle spectrometer). The forming of the relatively large solids particles is important for the commercial aspect of this method, since these particles can easily be filtered from the liquid by mechanical means. Fine-mesh filters work well, but centrifugal filtering is industrially more convenient.

After the shock waves hit the container wall (not shown), some of its energy is reflected and some propagates through the material of the process vessel (not shown in FIG. 1). The vessel has to be constructed to withstand the pressure generated; depending on discharge energy and timing it is on the order of a few hundred thousand psi.

Fortunately, the wall material (e.g. steel) has a tendency to work harden and even some permanent volume compression of the firing chamber's steel wall has been observed, probably due to the elimination of microscopic voids in the material. Also, a self-compression loading effect takes place on the inside surface of the process container (firing chamber), prestressing its inside surfaces. Firing chambers are illustrated in later figures.

As far as electrode materials and insulating materials are concerned, a certain burnup rate has to be expected, and these materials have to be replaced, either by dismantling the firing chamber (a hydraulic lock of the invention, discussed below, makes that arrangement practical to use in an industrial environment) and exchanging the used parts, or they can be continuously replaced. The central electrode can be fed into the firing chamber as it burns up, and the insulation around it can be extruded by an extrusion device mounted next to the electrode feed mechanism.

Depending on liquids to be processed, frequency of machine use, operating conditions, etc., the polarity can be either negative on the center electrode 12, causing electrolytic transfer of some material from the container wall and the concentric electrode 22 (which is in electrical contact with the container wall), or negative on the container wall, using up the center electrode more rapidly. Two opposing electrodes are also possible (shown in later figures); these can be adjusted externally by a mechanism as they are consumed, giving greater efficiency to the process but requiring a relatively complex feed mechanism.

What firing chamber design is used, what electrode arrangement and what materials are used in the process are subject to economic considerations, such as what liquids are to be processed, operating costs, permissible frequency and duration of service intervals, and so on.

Since all chemical compounds in the process liquid are being ionized, this method has a wide range of applications. Examples are the destruction of toxic waste, mineral recovery from waste, sewage waters and geothermal brines, the desalination of liquids, including the removal of nutrients that could cause bacterial growth, the processing of sewage water into irrigation water, etc. The machine can be used as a catalyst for chemical reactions and the photon flux can supply the energy for endothermic reactions.

Typical power levels are on the order of 20 to 25 kilowatts for a flow rate of approximately 40 gallons per minute through a machine, resulting in an overall operations cost of the equipment between 0.2 cent/gallon (high) and 0.05 cent/gallon (low), depending on the wear of the equipment.

These costs are important for the commercial applications of the process and the principal objective of the invention is directed toward bringing costs down per unit of production.

Since the conducted charges are quite high (for a 50,000 gallon/day machine they may be on the order of approximately 750,000 coulombs the difficulties experienced with this type of electrical discharge equipment have to do with the burnup of electrodes in the firing chamber and in the discharge switch serving the chamber. Therefore, the design of easily exchangeable electrodes in these parts is important for the usefulness of the electro-hydraulic process in commercial applications.

One aspect of the present invention is the use of solid state shock wave generation by transducers and the selective photolytic dissociation of molecular bonds by coherent light (use of lasers for ionization). The invention also contemplates the use of solid state switching devices, and more efficient firing chambers, as made from nonconducting materials such as quartz, ceramic, etc. With these features, operations cost can be brought down by approximately two orders of magnitude, making economic desalination of seawater possible.

It also should be pointed out that the energy efficiency of the process increases with the firing chamber volume, and that machines in accordance with the invention can be built in any size.

A prototype built for a throughput of 50,000 gallons/day (at power consumption of 27 kilowatts) requires approximately $100 to $200 per day in cost of electrical power and spare parts. This makes a basic embodiment of the invention suitable for all the applications described, except for economic mineral recovery from seawater and its use for irrigation.

II. Firing Chamber, Electrode/Chamber Erosion, and Attenuation of Shock waves (FIG. 2)

FIG. 2 shows an example of a liquid processing system (LPX) in accordance with one embodiment of the invention. Other configurations are possible and are discussed below.

The firing chamber body 24 in this embodiment may be designed for approximately 50,000 to 100,000 psi static pressure, and 500,000 psi dynamic pressure.

A firing chamber "lid" 26 or grounded electrode is held against the firing chamber body 24 by external hydraulic pressure (by structure discussed below in reference to FIGS. 4 and 5) or mechanically bolted to the firing chamber body (as by spring-loading, threads, bolts, etc.).

A bushing 28 comprising an electrical insulating sleeve is concentrically located inside the grounded electrode 26. Within the sleeve 28 is the center electrode 30, which may be stainless steel, nickel alloy, heavy-metal or copper-heavy metal alloy, depending on lifetime desired. This electrode can be fed into the chamber, together with a sacrificial sleeve 28 or independent of it, or the arrangement can be fixed and replaced periodically.

An O-ring seal 32 provides a liquid seal against process fluid leakage to the exterior of the preferably cylindrical firing chamber 34. At a process fluid inlet 36 there is a flow restriction 38. Adjacent to the inlet restriction 38 is a pressure equalizing volume 40 allowing pressure to equalize around the annulus of a gap 42 formed between the grounded electrode 26 and the firing chamber wall 44.

As indicated by a broken line 46 in FIG. 2, a sacrificial volume or burnup volume 48 is included in the electrodes and sleeve 28 and also in the firing chamber wall 44. This is the amount of material that can be lost without compromising the firing chamber performance.

The firing chamber 34 preferably includes a conical shock wave reflector 50 for reflecting the moving wave front and keeping it in the chamber 34 as much as possible. The process fluid exits the chamber through a fluid channel 52, and a shock attenuator 54 comprising a 90 degree sharp bend is included in the channel. A threaded fitting 56 with a conical inlet 58 may be rated for 5,000 to 10,000 psi operating pressure. A transfer line 60 leads from the fitting 56, and, depending on length, may have a burst pressure rating of 10,000 to 20,000 psi.

An air (or nitrogen) supply line is shown at 62, for feeding pressurized gas into a shock absorber vessel 64, which may be designed for about 800 psi maximum pressure, at operating pressures of between 50 and 150 psi. At 66 is a liquid outlet (or inlet) fitting (the flow through the firing chamber can be in either direction).

Proper damping of the generated shock wave energy in the process of the invention is crucial for the functioning of the system, since the equipment can be destroyed by unattenuated shock waves in a very short time. The hydraulic shock absorber structure 64 in FIG. 2 forms a part of the system of the invention. A second, similar hydraulic shock absorber (not shown) is used upstream of the liquid inlet 36.

The functioning of the hydraulic shock attenuation system is as follows:

The flow direction of the liquid through the firing chamber 34 has very little to do with the generation and attenuation of the shock waves from the discharge. The propagation speed of shock waves is large as compared to the speed of the moving fluid.

Fluid (wastewater, sea water, brine, etc.) enters the firing chamber through the inlet port 36, from a shock absorber which may be identical to that shown at 64. The space 40 is provided to give a uniform flow of liquid through the gap 42.

A conical section 68 of the electrode 26 helps attenuate the shock wave energy to an extent, along with the fact that the shock is generated in the opposite direction. This enables a fluid connection rated at about 1/20 that of the pressure rating of the firing chamber body to be used.

In the forward direction, the conical section 50 of the firing chamber reflects most of the shock wave back at different angles, and so avoids nodes of concentrated pressure from reflected waves. (This is for pulses generating pressure waves which are short as compared to the firing chamber dimensions.)

In fact, the shock wave energy is attenuated by multiple reflections inside the firing chamber 34 and is generally turned into a "white noise." The channel 52 together with the 90 degree angle at 54, provides for a very high flow resistance for fast pulses of "water hammer," and at the walls of the space 54 the rest of the shock energy coming down through the channel 52 is reflected back into the chamber.

Moreover, the attenuation of the primary shock is not the only item of concern. Gases generated by the electrolytic action of the current and by the chemical reactions of the compounds dissolved in the fluid generate expanding gas bubbles that accelerate the fluid out of the firing chamber. This amounts to a secondary "shock," smaller in amplitude, but longer in time.

So as not to disrupt the flow of the liquid by this action, differential flow resistance is built into the design. (If enough gas is precipitated, the firing chamber could be acting as its own pump because of the difference in dynamic pressure in the feed lines in and out, and the inertia of the water columns.)

The flow resistance of the gap 42 increases dramatically with the liquid velocity. At the 90 degree bend 54 there is also an increase in resistance, but to a lesser degree. Therefore the liquid has a tendency to move from point 38 to the fitting 56 as shown on the drawing, and not in the other direction.

The pressure rating of the inlet and outlet feed lines 60 depends to a great extent on their length. The pressure drops approximately linearly from the point 54 to the end of an input tube 70 in the shock absorber 64. The liquid level 72 is held near the tube end by a small supply of gas (air, but nitrogen if the oxygen is detrimental to the gases generated by the reactions).

The high liquid level 72a shown in the drawing is for the input shock absorber design, while the low level 72 is indicated for the output side. Through the gas supply 62 the external gas is supplied at a quantity or flow rate large enough to cover the loss of gas by turbulence in the container body 74, i.e. by mixing or dissolving of the gas into the liquid.

Since the flow resistance from the end of the tube 70 to the liquid surface is small, the tube back pressure is essentially the same as the gas supply pressure.

At 66 is shown the output (or input) connection fitting to the system, running at a constant 100 to 150 psi depending on flow resistance of the firing chamber-hydraulic connections, etc. Any primary shock wave energy coming down the lines is dissipated in the large volume of liquid in the shock absorbers and at the liquid surface therein.

The hydraulic fittings on the firing chamber have to be conically enlarged, as shown at 58, in order to prevent axial loading of the threads, that have been shown to fail if ordinary stepped fittings are used having a shoulder at this location. By using a chamfered bore, however, the dynamic pressure expands the fittings slightly and actually has a tendency to swage them in even tighter.

It should be pointed out that several pounds of the firing chamber material can be lost due to erosion and electrolytic action without compromising system performance. If the center electrode is held at negative potential, the lifetime of the entire arrangement is greatly enhanced. This is desirable for fixed mounted center electrodes 30, and sacrificial sleeves 28. For continuously replaceable center electrodes and fed sleeves or long lasting composite sleeves, a positive polarity on the center electrode prevents electrolytic erosion of the firing chamber body and of the lid 26. Depending on service intervals allowable and the design selected, either electrode material or firing chamber material can be selectively sacrificed. Therefore, if a fixed center electrode 30 is used, of heavy and corrosion-resistant construction, this electrode should generally be negative, with the firing chamber walls having the positive polarity where wear will occur. On the other hand, with a continuously fed electrode and surrounding insulative sleeve, the center electrode can be positive.

In order to keep the process functioning properly, the discharge from the energy storage bank must be prevented from overswinging in a negative direction; otherwise, both electrodes will be depleted electrolytically, and the lifetime of the equipment will be greatly reduced. Therefore the discharge circuit (is inductance and damping resistance) must be properly adjusted to the conductivity of the liquid and its plasma.

In one embodiment, i.e. a prototype, a fixed electrode 30 is used, and insulating bushings 28 are made from quartz or nylon, and therefore the center electrode 30 (tungsten) is run at negative potential.

The shock absorbers in the one preferred embodiment of the machine are about eight inches in diameter, and the liquid volume of the firing chamber may be 1/20 gallon. The gas volume in the shock absorbers 64 is approximately 5 times the volume of the firing chamber, and that arrangement has been found to work very well.

III. Overall System of One Embodiment (FIG. 3, 3A, 3B)

Figure 3:
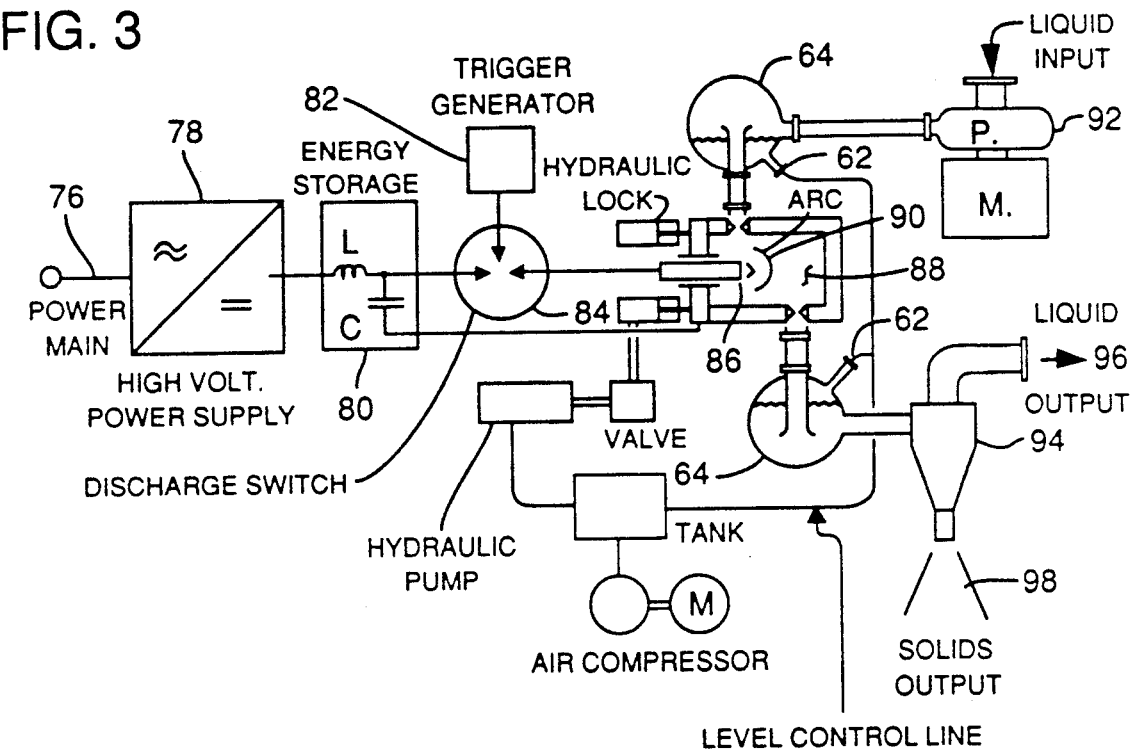
FIG. 3 is a schematic drawing of the system, showing a layout of an entire system in accordance with the invention, including the firing chamber, upstream and downstream hydraulic shock absorbers, power supply, discharge switch, liquid input/output and auxiliary systems.
Figure 3A:
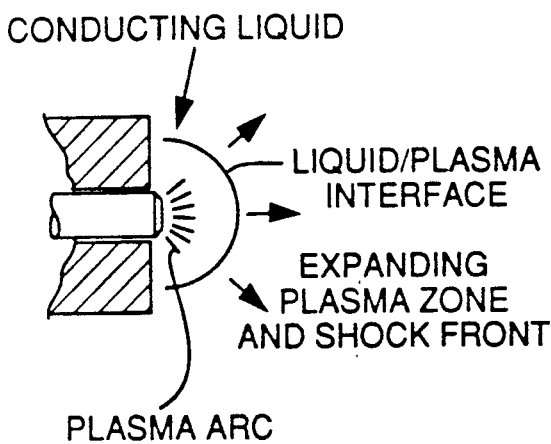
FIG. 3A is a detailed view illustrating a coaxial type electrode arrangement.
Figure 3B:
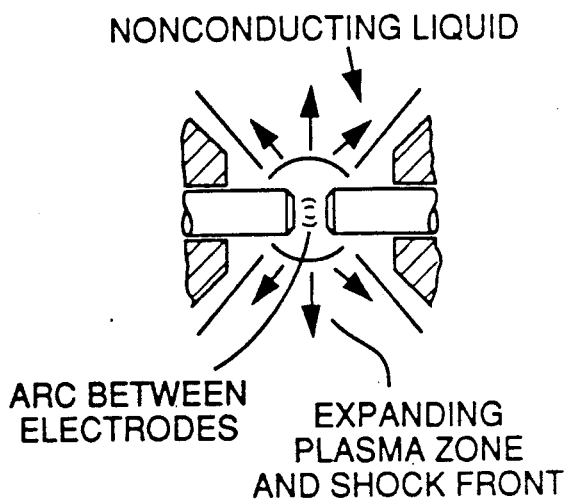
FIG. 3B is a view similar to FIG. 3A, but showing an opposed electrode arrangement.
Figure 3C:
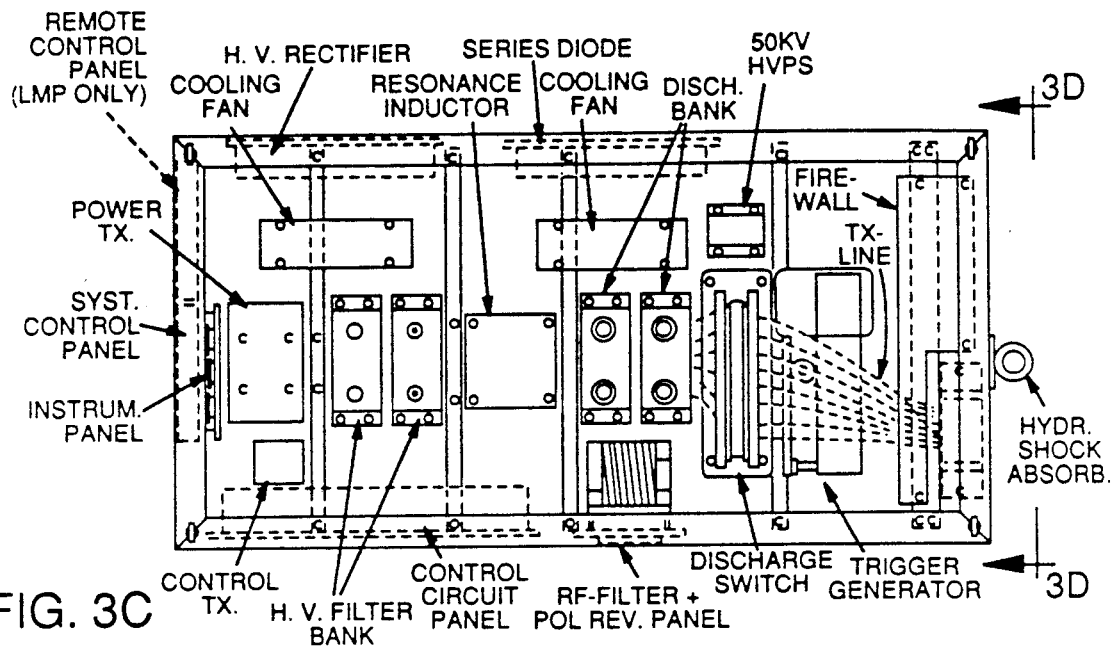
FIGS. 3C, 3D and 3E show in plan, end elevation and side elevation a prototype system built in accordance with the invention, and the location of principal components in an actual assembly.
Figure 3E:
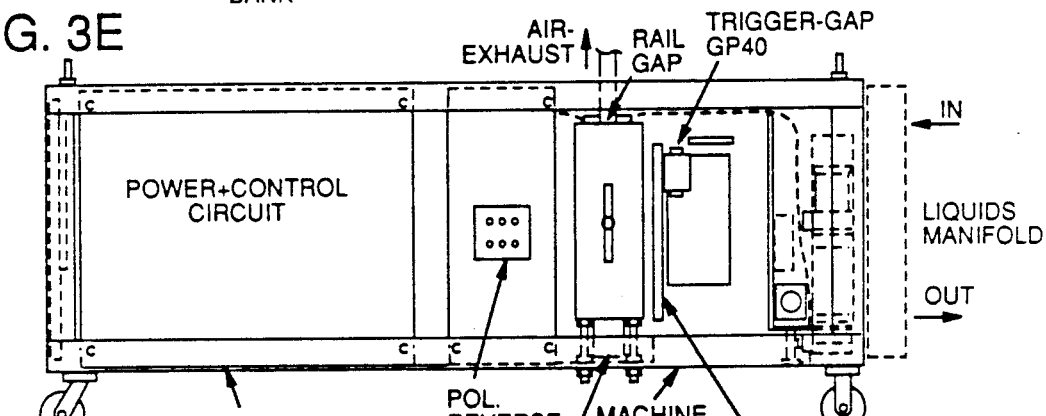
Figure 3D:
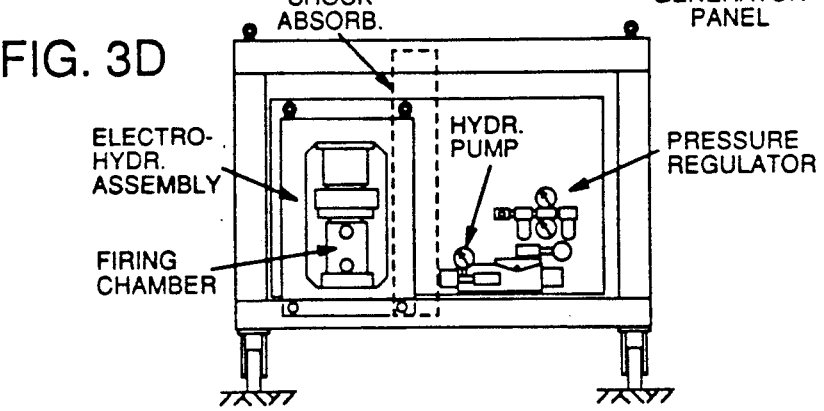

The schematic diagram of FIG. 3 shows one preferred embodiment of the overall system of the electrohydraulic liquids processor. FIGS. 3A and 3B show coaxial electrodes, wherein the firing chamber body is normally grounded to the outer electrode; and an alternative arrangement wherein a pair of opposed positive and negative electrodes are both in the form of rods. FIGS. 3C, 3D and 3E show arrangement of components in an actual assembly.

Referring to FIG. 3, power from a power main 76 is stepped up in a high voltage power supply (HVPS) 78, and charges an energy storage bank 80. This can be a capacitor bank (as shown) or an inductive store, or the energy can be supplied by an electromechanical pulse generator. When the bank 80 is charged, a trigger generator 82 fires the discharge switch 84, and the bank discharges its energy through the electrode 86 into a small volume of liquid 88 around the tip of the electrode.

The generated plasma expands, creating a shock wave 90 and a burst of light, which propagates through the liquid volume.

All electrical bonds between the molecules of the compounds dissolved in the liquid and the liquid itself are in essence temporarily canceled. The generated turbulence from the shock and the shock wave itself and its rarefaction zone precipitate dissolved solids out as insolubles (unless they are directly reactive with the liquid itself, or with each other). In the rarefaction zone, the solid compounds congeal into micron-sized particles that can be removed by simple filtering techniques. The flow restrictions in the firing chamber, in and out, provide for the reflection of the shock wave energy as discussed above, and the hydraulic shock absorbers 64 attenuate the rest, preventing damage to pipes and pumps of the system.

Since the discharge pulses are in the order of tens of microseconds (at a discharge current between 10 and 300 kiloamperes for a chamber volume of 1/20 gallon to one gallon), the wave length of the shock wave is on the order of a few inches.

Therefore, no valves are needed to close the firing chamber, and a continuous liquids exchange can be used.

As a pump 92 pumps the liquid through the firing chamber (constructed to withstand several hundred thousand psi peak pressure), the precipitated particles are carried by the advancing liquid stream into a centrifugal separator 94 (or any other kind of filtering device), where the solids are separated from the liquid and the liquid is then discharged at 96 and the solids (approximately 50% to 70% liquids content) are collected (98).

A level control line keeps the liquid level in the shock absorbers constant. The air lines 62 contain orifices to limit flow rate of air (or other gas) into the shock absorbers 64, and air is constantly being passed out of the shock absorbers with the liquid flowing through; the pressure inside the vessel is always less than the supply pressure from the air compressor.

The pressure drop of the firing chamber of the embodiment illustrated is approximately 50 psi, and the pressure drop in the separator 94 may be set to 60 psi.

In tuning of the firing chamber, experimental results have shown that different energy levels (and different discharge lengths) favor the precipitation of different chemical compounds from a mixture of all compounds, as should be expected by such a photolytic process.

In experiments performed with the illustrated embodiment, the shock front 90 traveled throughout the liquid volume while the discharge from the electrode was still active. The peak discharge current occurred at approximately ¾ the traveling distance of the shock front along its longest path length.

FIGS. 3C, 3D and 3E show in plan, end elevation and side elevation views a preferred assembly of a liquid processing system of the invention. These view show arrangement of most of the system components shown schematically in FIG. 3, with principal components labeled.

IV. Firing Chamber Configuration—Hydraulic Lock (FIGS. 4 and 4A)

Different engineering approaches to the firing chamber design are possible and are encompassed by the invention. The electro-hydraulic assembly 100 as shown in FIGS. 4 and 4A is intended for industrial applications of the machine; variations are contemplated for increased machine performance and for various operating modes.

The liquid processing system (LPX) may be run with two different types of insulators, one from nylon and one made from quartz. A nylon electrode sleeve 102 is shown in FIG. 4.

Figure 4:
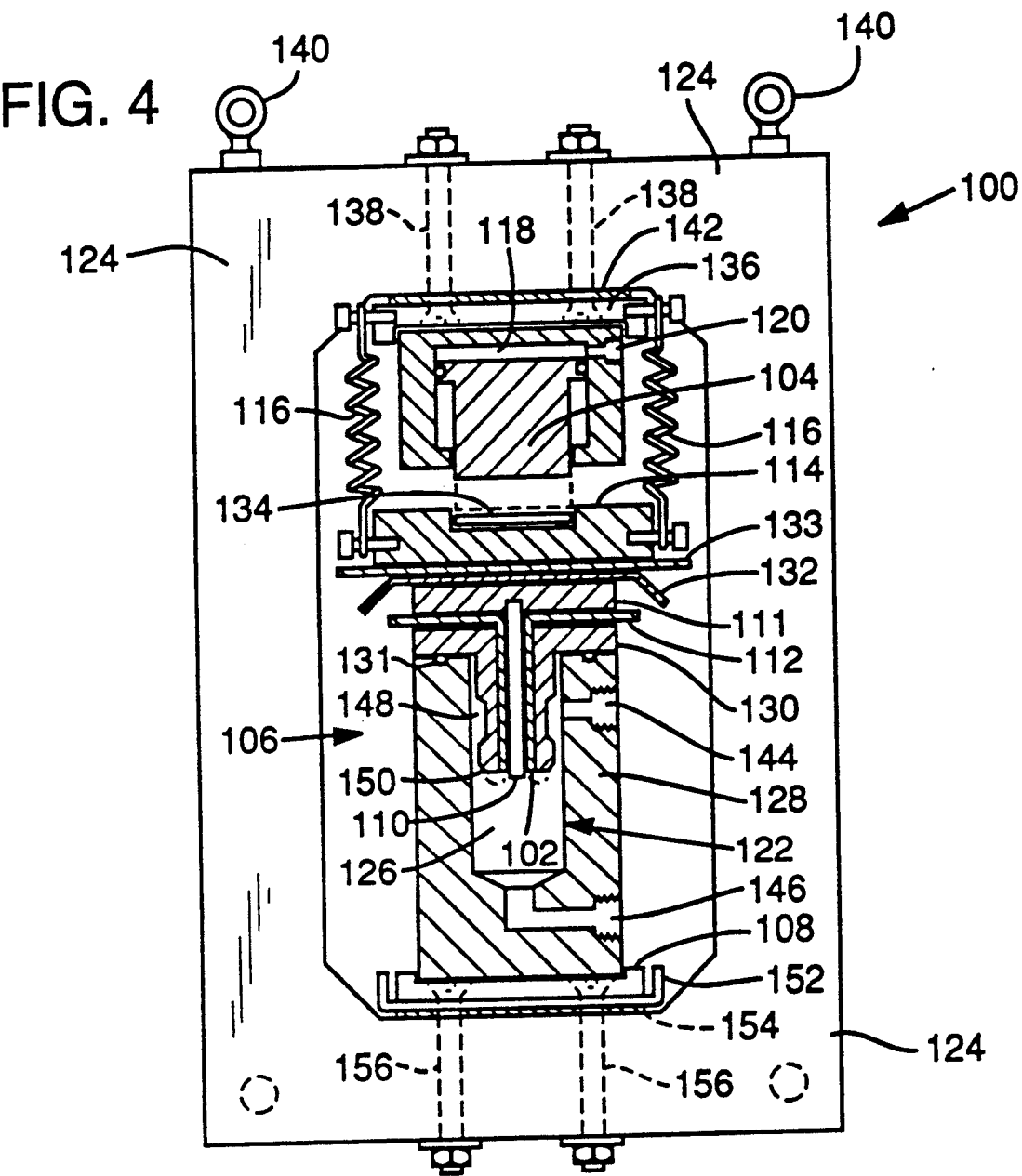
FIG. 4 is a sectional view showing a preferred firing chamber construction wherein the firing chamber assembly is held together by hydraulic pressure and with provision for facilitating convenient exchange of firing chamber components as they are used up.
Figure 4A:
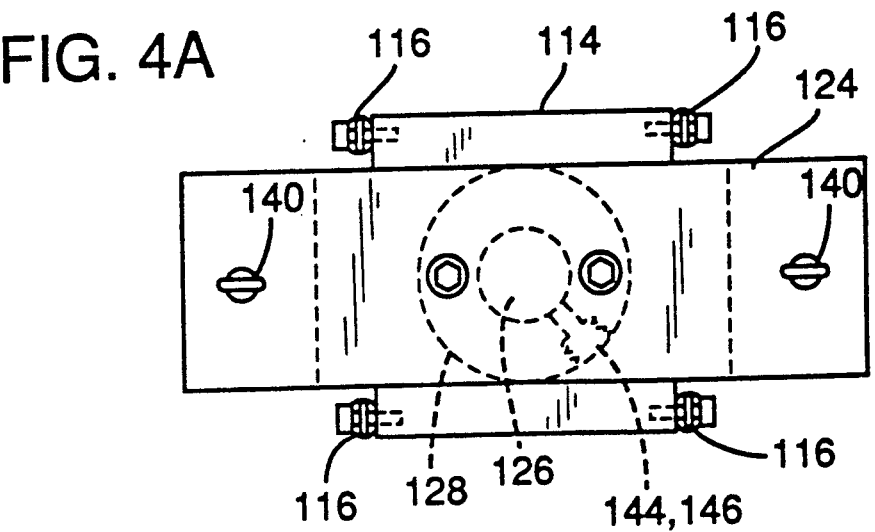
FIG. 4A is a top plan view of the firing chamber construction of FIG. 4.

Shown in the drawing of FIG. 4 is the firing chamber assembly of the machine of this embodiment, and the mounting arrangement or assembly arrangement of the accompanying components.

By lifting an hydraulic piston 104 to an upper position as indicated in solid lines, the entire firing chamber assembly 106 can be lifted from a lower cradle 108, and the center electrode 110 and connected anvil 111 and insulator 112 at a head end of the assembly can be replaced in a matter of a few minutes. A load transfer plate 114 may be biased by retraction springs 116 (four may be provided) toward an upper position (shown in lower position), moving the piston 104 up as it rises. With this movement, hydraulic fluid moves out of an hydraulic cylinder 118, exiting through an inlet port 120. With the piston 104 retracted, this leaves the components at the top of the firing chamber 122 available for removal and replacement. A frame 124 (as of structural steel) supports these components and provides a rigid framework against which the hydraulic force acts.

The fluid lines used are flexible hydraulic high pressure hoses and need not be disconnected for this service operation.

This "hydraulic lock" of the firing chamber structure is an important feature of the invention, since it provides operator convenience and time savings, on a machine in operation.

The illustrated arrangement may be called the electro-hydraulic assembly, and comprises the most highly stressed part of the system of the invention.

The liquids processing takes place in the liquid volume space 126 of the firing chamber 122.

The hydraulic pressure from the hydraulic ram or piston 104 not only holds the firing chamber closed against the explosive pressure generated by the plasma arc, but also provides the liquid seal between the firing chamber body 128 and the grounded electrode 130 (a seal is provided at 131), between the grounded electrode 130 and the coaxial insulator and pressure seal 112, and between the insulator/pressure seal 112 and the anvil/electrode holder 111. Also, this arrangement provides the contact pressure necessary for electrical connections between the lower cradle 108 and the firing chamber body 128 (for the grounded electrode) and between an electrical power connecting plate 132 and the anvil 111 (for the center electrode). An electrical insulator pad 133 insulates the power plate 132 from the load transfer plate 114 above.

Another important feature of this arrangement is in the self-aligning of the assembly with the hydraulic cylinder 118, by the use of a nylon disc 134 that liquefies under the hydraulic pressure and allows for self-centering and axial alignment of the force applied by the piston 104. This prevents side loading and wear of the piston in the cylinder 118, and assures an equal pressure necessary for a positive sealing action of the firing chamber parts around their circumference. Manufacturing tolerances, i.e. variations from part to part, are taken up in this way.

The retracting springs 116 hold the upper assembly in place, i.e. they retain the cylinder 118 against an upper cradle 136 (retained to the frame 124 by bolts 138), and the load transfer plate 114 against the lower end of the piston, as discussed above.

The described hydraulic firing chamber lock assembly is especially useful for constructions wherein the electrodes have to be replaced manually and are not fed automatically into the firing chamber, since frequent refurbishing might have to take place.

Another feature of the hydraulically operated firing chamber is that the firing chamber components are preloaded by the external pressure, and therefore the alternating, internal pressure does not fatigue the firing chamber body 128 as much as it otherwise would.

The heavy assembly frame 124 shown in FIGS. 4 and 4A helps to keep down vibrations caused by the operation of the firing chamber. The firing chamber is also designed in such a way that the weight of the firing chamber body approximately equals the weight of the "lid" (i.e. the parts 111, 112 and 130 as well as the electrodes and insulator themselves) and the plate 114, thus resulting in cancellation of the vibration generating forces in the up-and-down direction, and keeping the frame steadily at the same location.

The following further components are shown in the schematic assembly views of FIGS. 4 and 4A: A pair of lifting eyebolts 140 secured to the frame 124; a pressure pad 142 (e.g. brass or copper plate) between the frame 124 and the upper cradle 136; process fluid inlet and outlet ports 144 and 146 in the firing chamber body 128, communicating with the liquid process volume 126; a manifold volume 148 in the firing chamber/process volume, for evenly distributing the input process fluid; a shock wave attenuator gap 150 in the firing chamber, as discussed above (FIG. 2); a grounded electrical power connection 152 in electrically conductive connection with the firing chamber body 128; a bottom pressure pad 154; and bottom connecting bolts 156.

Figure 5B:
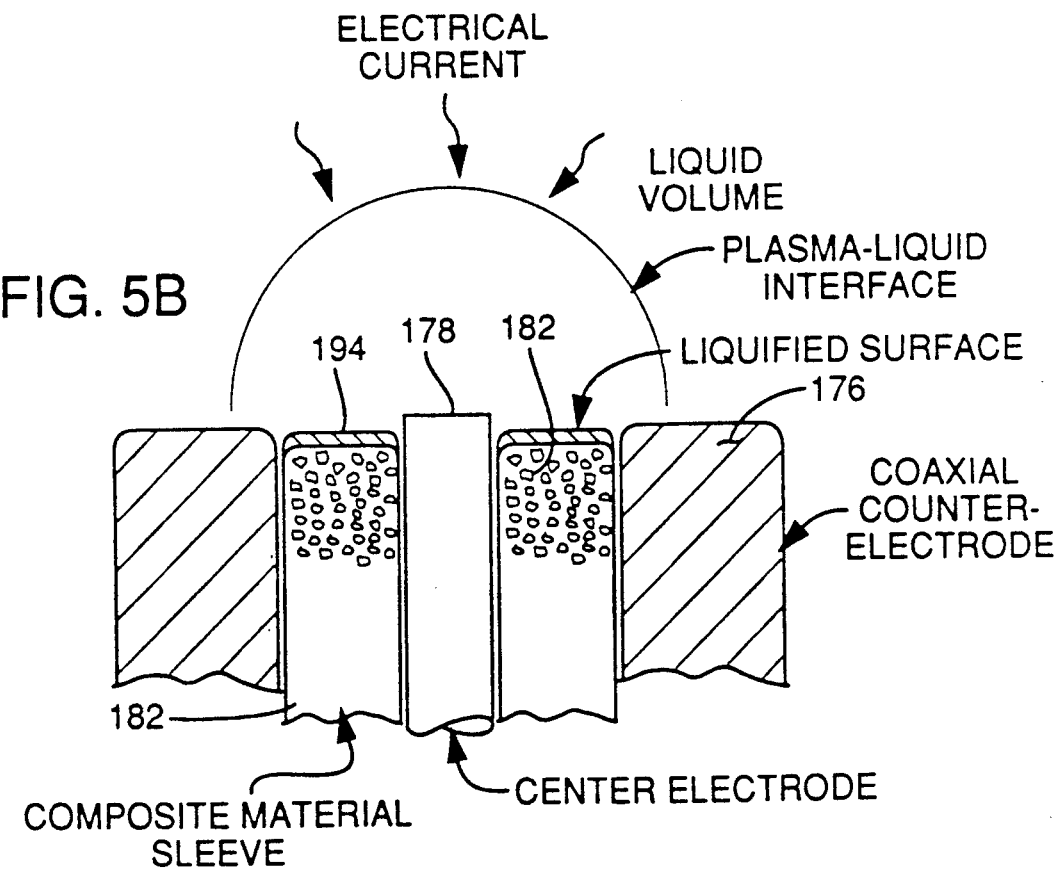
FIG. 5B is a detailed view showing a coaxial electrode arrangement, with an insulating sleeve formed of a special composite material for longer life.

V. Variations of LPX Firing Chamber; Electrode Feed Mechanism, Flat Plate Transmission Line and Methods for Generating Faster Pulses (FIGS. 5, 5A, 5B)

Figure 5:
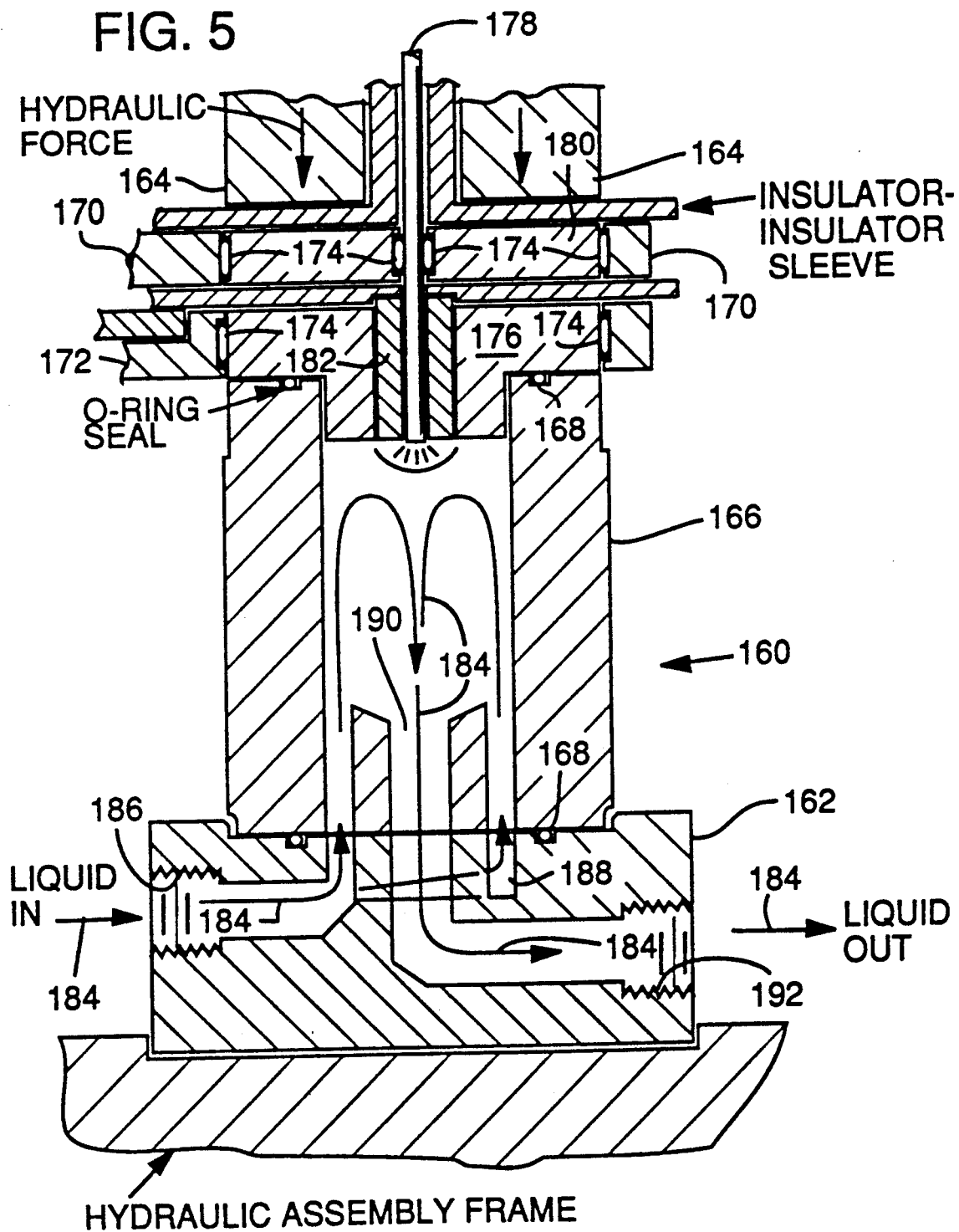
FIG. 5 is a fragmentary sectional view showing a portion of a modified firing chamber construction wherein liquid infeed is from the bottom of the chamber and outflow is through the bottom center, and showing an electrode feed arrangement.
Figure 5A:
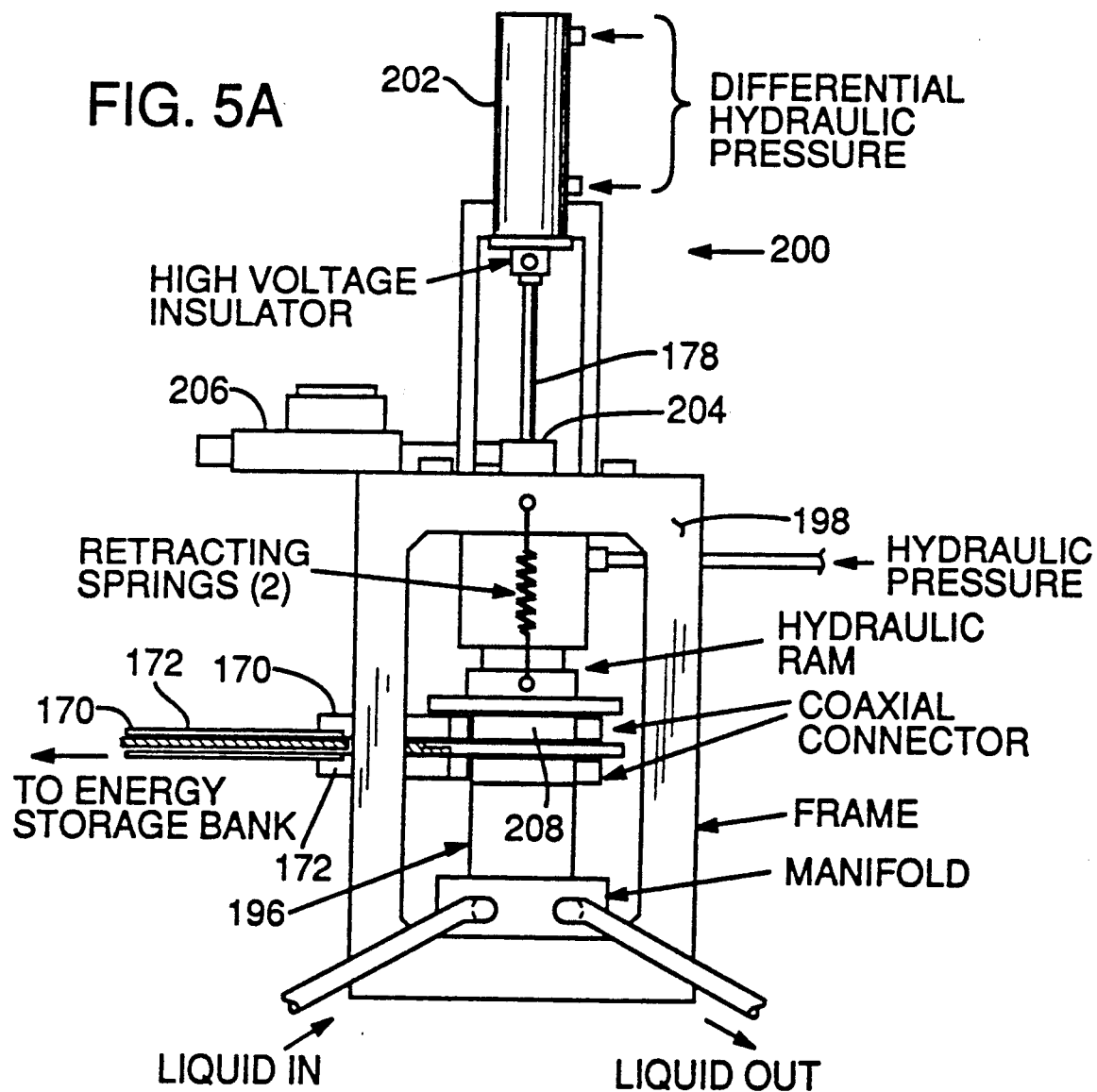
FIG. 5A is a schematic view showing an overall firing chamber assembly, including a fed center electrode apparatus, and extrusion device for extruding an insulator sleeve which follows the advancing center electrode, and other components involved in this embodiment of a firing chamber construction.

The drawing of FIG. 5 shows an alternate configuration 160 of the LPX type firing chamber. In this case an external liquids manifold 162 is used. When the hydraulic ram 164 is withdrawn (generally as discussed above), the firing chamber body 166 can be lifted off the manifold and carried elsewhere for rebuilding without the need to disconnect hydraulic lines. In this embodiment the firing chamber is connected both at top and bottom by pressure seals (O-rings are shown at 168, top and bottom), providing for easy disassembly of the parts. Coaxial connections to flat plate power transmission lines 170 and 172, via spring contacts 174, are easily released when the hydraulic ram 164 is withdrawn, leaving the "lid" (grounded electrode 176) free. For the center electrode 178, a conductive disc 180 transfers current to the electrode via the spring contacts 174, as shown.

In this arrangement the center electrode 178 is fed into the chamber by an external mechanism (e.g. a cylinder actuator as in FIG. 5A), but the insulating sleeve 182 is not. The insulating sleeve is made from a composite material of high temperature resistance (e.g. carborundum, quartz) and a carrier material that absorbs the mechanical shock and substantially liquefies under shock wave pressure (e.g. teflon, polyolefins).

FIG. 5B shows schematically the assembly of the composite insulator 182 and the center electrode 178. The insulator 182 absorbs and attenuates the shock. Its carrier material melts and evaporates at the surface 194. The quartz or sapphire particles then form a burnup-resistant film on the surface 194, so that insulator life is extended without "feeding" an insulator into the chamber.

As indicated by arrows 184, flow of process liquid in this embodiment is from an inlet port 186 to an annular inlet channel 188 into the chamber, then out through a centra exit channel 190 and an exit port 192.

The drawing of FIG. 5A shows an LPX type firing chamber 196 and frame 198 fitted with an electrode feed mechanism 200 in accordance with the invention. This may be in the form of a hydraulic cylinder 202 as shown, capable of adjusting the position of the electrode rod 178 reaching down into the firing chamber. An insulating sleeve extruder as shown at 204 (with associated extruding equipment 206) provides a continuous replacement of the insulated sleeve component, as both the center electrode and the sleeve around it are used up.

In this way, the down time of the machine can be reduced greatly, making a more profitable operation possible. Also with this arrangement, higher discharge currents can be used (using the flat plate transmission line 170, 172) resulting in hotter plasma operation, shorter wave length of light with greater ionization-potential, and therefore more efficient operation and savings in energy. (The entire light spectrum of the arc is shifted more toward the ultraviolet due to hotter operation.)

The electrical connection to the center electrode is made by two spring-loaded metal blocks (not shown). The insulating sleeve flows around them under the pressure of the extruder. This arrangement is located inside the connector 208 of the center electrode.

VI. Opposed Electrode Arrangement; Conductive Coolant Fluid as Trigger; Fixed and Extruded Insulator Sleeves (FIG. 6)

For nonconductive fluids and/or for greater firing chamber efficiency, opposed electrodes should be used. Because of the inductance of such an arrangement, higher operating voltages have to be generated. The higher voltages are also necessary to break through the gap in the case of nonconductive process fluids (hydrocarbons, etc.). Since the shock wave and the light energy can spread out in all directions, here an increase in efficiency of about a factor of two can be realized.

Figure 6:
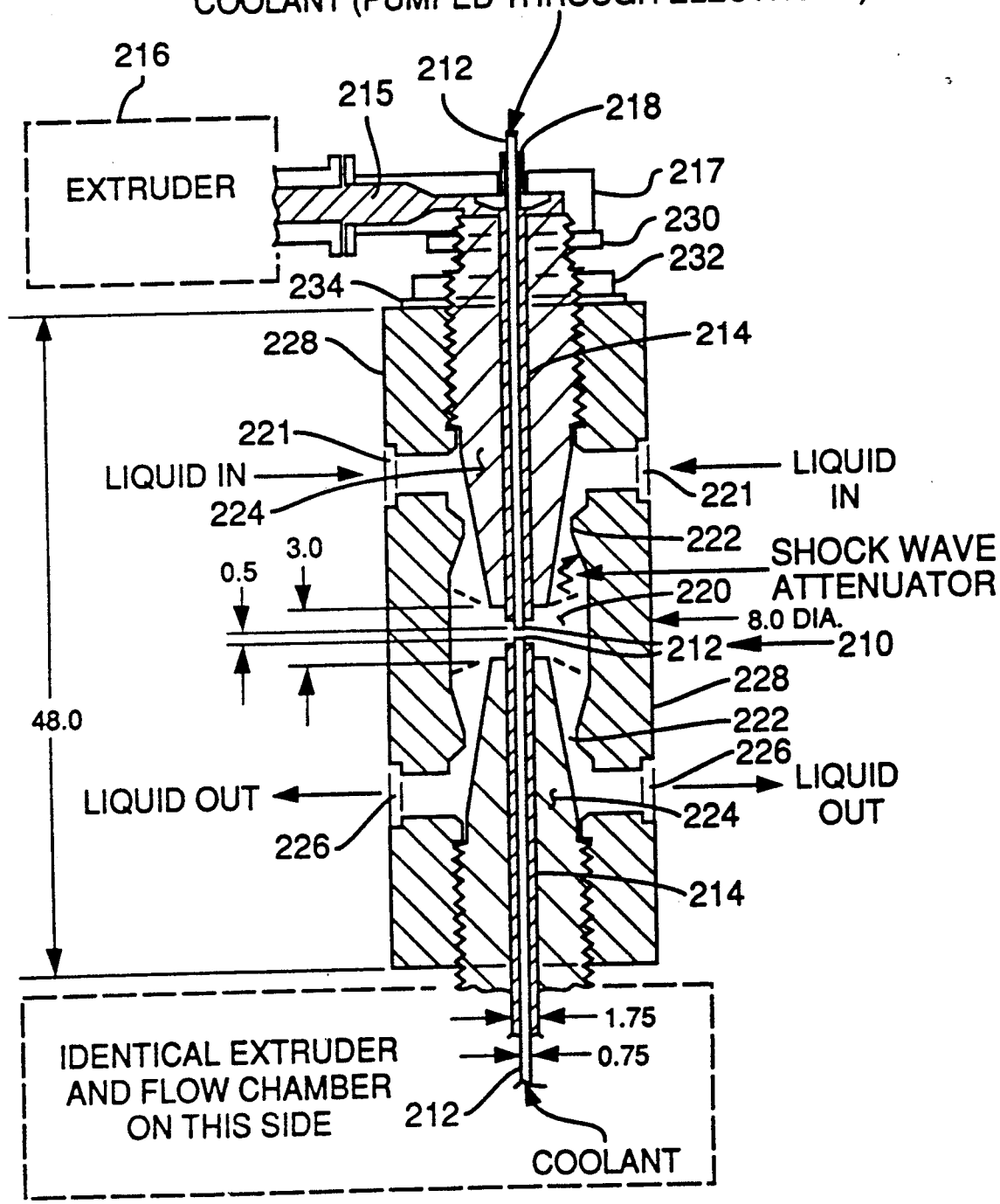
FIG. 6 is a sectional view showing another embodiment of a firing chamber in accordance with the invention. In this embodiment the electrodes are opposed, with both electrodes fed into the chamber and including a fed, extruded insulating sleeve around each electrode.

Shown in the drawing of FIG. 6 is a firing chamber 210 designed for a flow rate of, for example, two million gallons per day, using fed electrodes 212 and extruded thermoplastic insulating sleeves 214. The position of the electrode tips is electronically sensed and the feed mechanism driven accordingly.

The feed rate of the extruded insulating sleeves is adjusted by driving the extruder 216 motor (or piston, etc.) at the proper rate. The sleeve extrusion material 215 is forced through a flow chamber 217 as shown. (Chamber held to electrode holder using threads and nut 230).

High power connections are made at the outside of an insulating seal 218, using laminated contact springs (multilam connections).

The discharge current may be approximately 300 kiloamperes peak for this operation, and the energy used per gallon of fluid (the space indicated at 220) may be about 16 kilojoules. Because of the skin effect occurring at this high discharge current, the electrodes must be internally cooled and are therefore hollow, with a bore of about ⅜ inch diameter (see FIG. 7).

The fluid to be processed enters through two opposing process liquid ports at 221, passes through a narrow gap 222 (e.g. 6 inch diameter) between the firing chamber wall and a conical electrode holder 224, and arrives at the process space 220, where it is irradiated.

The fluid then leaves through an identical output arrangement with outlet ports 226, as shown in the drawing.

The firing chamber body 228 preferably is constructed from steel with a yield strength of 180,000 psi; the electrode holders 224 may be Type 416 heat treated stainless steel with replaceable protective threaded nuts on their tips (not shown). A spring-loaded washer 234 preferably is used between a nut 232 and the firing chamber body 228, at the outer end of the electrode holder as shown.

The fluid used for electrode cooling is the same as the process fluid. A small amount is diverted and pumped through the hollow electrodes 212 by a high pressure pump, and it exits the electrodes into the process volume. Operating voltage for this arrangement may be 20 to 40 kilovolts, depending on the process fluid. In the case of a nonconducting process fluid, the electrode cooling fluid can be made conductive (salt water, etc.) and can act as an initiator for the plasma discharge, or it can be doped with certain elements emitting light at a selected wavelength-peak for specifically exciting certain chemical bonds.

Attenuation of the shock wave energy is achieved by the fact that multiple reflections occur between the electrode holders 224 and the converging space of the firing chamber, as shown in FIG. 6. By the time the shock front reaches the flow gap 222, it has lost most of its energy.

The converging/diverging flow channel also guides the fluid into the process region 220 without causing great turbulence and mixing between already processed and new incoming fluid, avoiding wasting of energy by having to process some of the fluid volume twice.

Schematically, the machine is identical to the system described above, except for the higher-power feature, requiring a larger power supply, storage bank, etc.

The incoming and outgoing fluid passes through external hydraulic shock absorbers in the same manner as explained above (not shown in this drawing).

Figure 7:
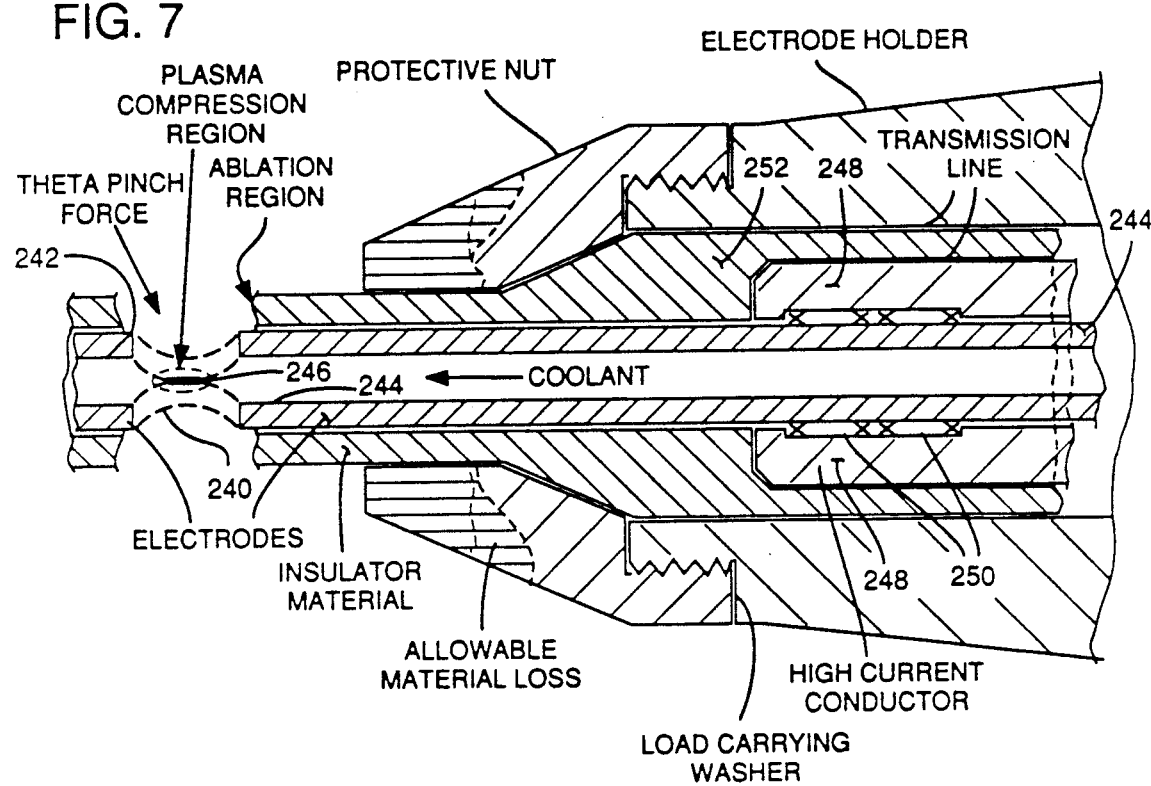
FIG. 7 is a sectional view showing a portion of an electrode assembly wherein the electrodes are opposed and the arc radiation is shifted toward shorter wavelength using plasma compression.

With this type of firing chamber layout, i.e. with opposed electrodes, a further increase in efficiency can be realized by using larger-diameter, thin-walled electrodes in combination with vary fast pulses, as shown on the drawing of FIG. 7.

Figure 7A:
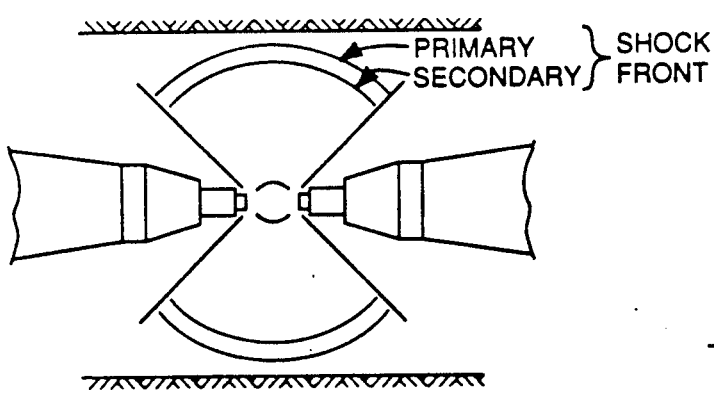
FIG. 7A is a schematic representation illustrating the pattern of shockwave fronts which can occur with plasma compression.
Figure 7B:
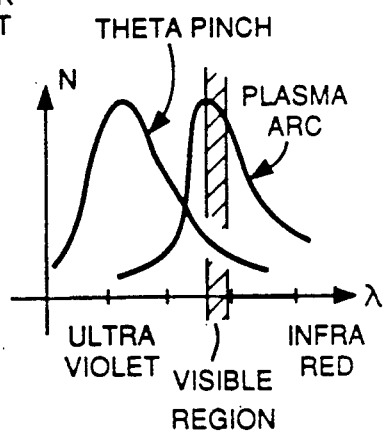
FIG. 7B is a graph plotting energy versus wavelength in the plasma compression or theta pinch mode of operation.

VII. Plasma Compression Chamber and Short Wavelength Generation (FIGS. 7, 7A, 7B)

Different chemical compounds and elements require different dissociation energies. However, in a bulk process like the arc-generated electro-hydraulic process, much of the radiated energy (approximately ½ of the supplied energy into the arc) is in the infrared region. The energy associated with these photons might be too low to ionize the compounds/elements in question.

Therefore, it is apparently desirable to use plasma temperatures as high as possible, since the radiated light has a tendency to decay toward the longer wave lengths in any event. Therefore, unless one wants to excite certain bonds and not others, which would require irradiation at narrow light bandwidths, higher plasma temperatures would correspond to greater system efficiency.

Referring to FIG. 7, the plasma temperature can be raised by a "theta pitch" type plasma compression. In that process a cylindrical plasma structure collapses inwardly on itself, as at 140, building a fine, highly compressed filament having a high temperature. The kinetic energy of the magnetically driven imploding plasma ring 240 is converted into extra heat during the compression phase.

The principle behind this process is that the increasing magnetic field associated with the discharge current through the opposed electrodes 242, 244, and driven by the discharge current itself (the movement of the ionized matter) results in a motoring force that accelerates the ions inward in a radial direction.

There are two shock fronts generated by this process (shown in FIG. 7A). Depending on the discharge current waveform, a primary shock front is generated by the exploding outer plasma shell, at a time when a magnetic field is still relatively weak. Following this primary front is a secondary, very steep shock wave caused by the explosion of the collapsed plasma ring that occurs when the radially accelerated plasma atoms bounce off each other in the center 246 between the two electrodes.

To provide a strong enough magnetic field for this process, the electrical pulses must be very short in order to provide the required discharge current (at a given energy per pulse). The hollow electrodes 242, 244 used to generate the plasma ring would be too small in diameter and too long (from the connection to the discharge in the middle of the firing chamber), resulting in too high a circuit inductance and resistive losses. Approximately 10 nanohenries inductance is allowable for the 500 kiloamperes to 1 megaamperes current.

Therefore the current is carried by a coaxial sleeve 248 to the front end of the electrode. Sliding contact springs 250 carry the pulse current to the electrode 244.

The insulation 252 for the coaxial system is provided by extruded material (nylon, teflon, etc.) which is fed into the system as shown previously. The hollow electrode 244 is cooled as explained before—a pump pushes coolant fluid (which may be electrically conducting) through the electrodes and cools the coaxial transmission line 248 as well as the electrodes. For a 500 kiloampere pulse system, a few kilowatts of cooling power are required, depending on the pulse width (in the microsecond region) and the surfaces of the transmission line (silver/rhodium plating reduces the skin effect losses greatly).

It should be pointed out that the energy required to drive such a system is actually less than for the same system operating in a non-theta pinch mode (also referred to as "plasma bounce"); approximately 2 kilojoules per liter of fluid would be an average value.

There is also a shock wave traveling down the length of the bore of the electrode 244, but its attenuation at the electrode end is not a problem.

Energy for such a system can be supplied from a capacitor bank through a flat plate transmission line (not shown in FIG. 7), which feeds into the coaxial electrode holder/transmission line 248 just outside the extrusion-mechanism. The system is quite similar to the opposed electrode-arrangement described earlier, that operates in a regular non-compression mode of operation.

The specifics of the plasma-bounce arrangement are as follows: the protective nut at the tip of the electrode holder, which is a replaceable item since material loss is to be expected there; the better electrical parameters tailored for faster pulses; higher current discharge switches must be used; and the sleeved electrode arrangement keeps the inductance and skin resistance down.

The drawings of FIGS. 7 and 7B show how the plasma ring is compressed into a thin, very hot filament 246 that radiates in the far ultraviolet region (FIG. 7B), and how the extrusion process provides the required electrical insulation for the electrodes. The insulating sleeve is continuously extruded between the electrode holder and the high current conductor, and through a narrowing conical space toward the electrode tip. The high current is carried not through the entire length of the electrode, but through the high current conductor (generally on its outer skin) and then through the contact springs, as explained above, into the electrode itself. In this way the full length of the electrode under high current conditions is avoided. This avoids the high inductance and resistance which would be encountered if the full length of the electrode were used for current conducting.

To keep the current from electroplating material off the firing chamber walls and the electrode holder, the electrical system is insulated from the firing chamber, which is at ground potential.

VIII. Rail Gap Construction (FIGS. 8-8D)

In order to make the electro-hydraulic principle useful for industrial processing, high discharge currents have to be switched repetitively from the energy storage bank, preferably a capacitive storage bank, into the firing chamber.

Although commercially available switches such as ignitrons, thyratrons or spark gaps could be used, the price and lifetime of these components is still not adequate at the present time to make them useful for the high-current, high repetition-rate duty required here. The system of the preferred embodiment of the invention, for example, may run at a repetition rate of 12/second, which is not too high for ignitrons or thyratron-firing, but the cumulative switched charge makes frequent replacement of tubes necessary, which is costly and results in much down time for the equipment.

In the case of the two million gallon/day larger processing system whose firing chamber was discussed previously, the switching conditions are even more severe—the best available thyratron would have to be replaced every few weeks and a whole bank of them would be needed, resulting in high circuit inductance in addition to the high cost, so that the processing system would be very difficult to use in an industrial environment.

Solid state devices are being continuously developed for higher currents and show great promise for the future, since they would never have to be replaced in ordinary service. However, at the present time only a bank of them could switch the discharge current required for an average size liquid processing system of the invention.

Accordingly, a discharge switch has been developed as a part of the present invention, that is based on the principle of easily replaceable electrodes. Plasma gaps are known as the highest current carrying devices constructed so far, but their physical arrangement required a lengthy replacement procedure in the past, when their electrode material was used up. That made them unsuitable for firing chamber operation as in the present invention.

The idea behind the new development is in the fact that no matter how the electrodes are arranged, a certain amount of electrode material is always lost at each firing. However, the amount lost per unit of charge conducted is directly dependent on the current density to which the switch electrodes are subjected and goes down rapidly if the same switch current is spread over a large surface area.

That principle has been used in the past in the construction of rail gaps and rotating-arc devices, both involving the concept that the electrodes should be kept as cool as possible during the discharge.

In the new design of the present invention, a rail gap has been constructed that has a large amount of electrode material built into it to begin with, and nearly all of that material can be burned off without disturbing the operation of the device. In addition, it uses heavy-metal electrodes that are not fixed and bolted to the transmission line, carrying the current, but are mounted on a contact slide that pulls out from the high current conducting block in a matter of seconds and enables a new electrode pair to be inserted. Both these features increase the usefulness of the device substantially, so that no technically skilled personnel are required for the servicing of the rail gap, and the down time for maintenance is very short.

Laminated springs provide a low-resistance contact, all along the length of the rail gap, assuring equal current density at each point of the rail.

A blower extinguishes the arc as soon as the current ceases to exist and restores the insulation feature of the device, ready for the bank to build up its charge again without keeping the switch conducting.

For a typical rail gap of this construction the operating voltage may be quite low, about ten kilovolts in the case of examples described herein.

To assure equal ignition of the entire plasma sheet all along the rails, a fast ignition generator has been provided, that uses 50 kilovolts (75 kv maximum) to ignite the rails that carry only ten kilovolts. The ignition arcs are current driven through drop off resistors from a fairly large storage-capacitor and a number of them are distributed all along the rails at about 1⅛ inch intervals. This ignition works regardless of whether there is power in the rails, making very low operating voltages possible.

This is a distinctive feature of the new rail switch, since normally rail gaps and spark channels have been ignited with an ignition voltage equal to or even ½ of the operating voltage.

In the case of the rail gap of the present invention, the ignition occurs in a time period so short that any variation of ignition timing from one part of the rail to another is negligible in comparison to the power-current rise across the rails. (At 40 kiloamperes, the maximum normally used discharge current in a system constructed as a prototype of the invention, the current reaches the 10 kiloampere point in 10 microseconds. At 85 kiloamperes (the maximum allowable discharge current), it reaches the same 10 kiloampere point in about three microseconds). The ignition current reaches its maximum in approximately 0.1 microsecond, so that a possible 10 percent variation of that would be quite inconsequential for the current distribution along the rails.

The importance of equal current distribution on the rails is of course that it provides the longest lifetime of the rail electrodes.

To further aid that principle, the current to and from the rails is carried by a number (e.g. 16) of coaxial lines, all equal in length and balanced in their conductance at the connecting points at capacitor bank and firing chamber.

Any increase in current through one line would result in a decrease of switched voltage in the rest of the rails (the resistance of the center conductors of the coaxial balances against the negative resistance of the arc) and therefore the system balances itself into a steady state, with the current density the same at every point along the rails.

The drawings of FIGS. 8 through 8D show the rail gap 260 assembly in accordance with the invention, in a construction which can be operated up to about 500 kiloamperes. The drawing shows the electrode arrangement, with the main or rail electrodes 262 easily replaceable by sliding operations.

As can be seen in the drawings, the design of the rail gap and the ignition circuit is quite simple. The value of this arrangement is in the ease of operation, the simplicity of the circuit and the fact that the heavy metal electrodes can be burned away completely before they must be replaced.

In the design built for the preferred embodiment of the present invention, i.e. the liquid processing system described, pure tungsten electrodes 262 are used, which are nickel plated for solderability. The switch electrodes 262 may be assembled from six pieces each, about three inches long soldered with lead-tin solder to the sides (left and right) so as not to distort the straightness of slides 264 and affixed rails 262 when the solder solidifies.

Ignition electrodes 266 (which may be 16 in number) are held by an insulating rod 268 (FIG. 8B) that is clamped on both ends against front and back plates (back plate 270 visible in FIG. 8B) of a plenum 272. As the electrodes 266 burn up, the holder 268 is pushed upward by adjustment as needed. About ½ year's operation can be had from one set of 16⅛ inch diameter tungsten ignition electrodes 266, each 12 inches long.

Ignition wires 274 make contact to the ignition electrode rods via contact springs located inside of hollow bolts 276, through which the electrodes 266 pass, so that these electrode rods 276 are slidable inside the bolts 266.

A blower 278 on the bottom of the plenum 272 applies an air stream 280 through the switch gap 282 that extinguishes the arc as soon as the current stops flowing, to provide quick restoration of the insulation of input and output side.

There is enough air supplied to move the entire arc one inch away from the rail electrodes 262 in less than a millisecond, during which time the voltage increase from the main power supply is only a few volts—not enough to jump the gap.

During ignition and during firing the continuous air flow moves the arc also, of course, but the discharge time is so short that during the entire discharge time period the arc moves only approximately 0.05 inch at the most. As explained earlier, the contact from and to the electrodes 262 is made by spring loaded laminations 284, between the slides 264 and slide holder structure 286, that provide very little contact resistance and a good tight fit of the slides 264 in their holders so they do not move, despite the vibrations of the blower motor, and of the entire liquid processor.

The burn products (tungsten oxide, etc.) are exhausted in the air stream, that is, channeled through a duct 288 away from the machine.

The ignition circuit (FIG. 8D) is self firing and does not require any electronic timing elements or trigger for its operation.

Power for the ignition generator may be supplied by a 75 watt 75 kilovolt DC power supply that is regulated down to 50 kilovolts. The capacitor C1 (FIG. 8D) is charged via R1 to about 40 kilovolts. At that voltage, the gap GP40 breaks over and charges the ignition electrodes 266 via the balancing resistor(s) R2. Since the ignition circuit inductance and capacitance is quite small (only about one microhenry and approximately 100 pf line capacitance is present), the voltage rise on the ignition electrodes 266 is fast, and they fire almost simultaneously, discharging C1. After C1 is empty, the circuit balances itself against the low-impedance power circuit through R3 and remains neutral. Then the gap GP40 cools off and C1 charges again for the next pulse. By adjusting the gap at GP40 and choosing a suitable drive voltage for the 50 (75 kv) power supply, the pulse repetition rate of the discharge, and therefore that of the firing chamber, can be selected.

Although the circuit is built to run at 40 kilovolt ignition voltage, it works well and fires smoothly and continuously from 15 kilovolts up.

This type of ignition circuit was chosen for the liquid processing system of the invention, because of its simplicity and its lack of semiconductors and low-level electronics, which have shown a tendency to fail in high-voltage type applications, especially where high discharge currents and therefore high levels of generated RF are present.

The slides 264 and the slide holder 286 shown in the drawing are manufactured from steel, nickel plated, and the coaxial cable 290 (FIGS. 8B, 8C) ground line connection rods 292 (FIG. 8B) are made from brass and insulated with Teflon (ultraviolet resistant).

The plenum is a fiberglass box, painted with UV-absorbing paint to prevent molecular damage.

The slides 264 can be refurbished with new electrodes indefinitely. Although tungsten is used in the preferred embodiment, other metals and metal alloys have shown to work quite well. Hastalloy (nickel alloys) works quite well as electrode material with somewhat reduced lifetime, but is much less costly. Ordinary stainless steel electrodes last quite well, and can be used for low cost and infrequent operation. Continuously run they last about one day, depending on the discharge current.

Figure 9:
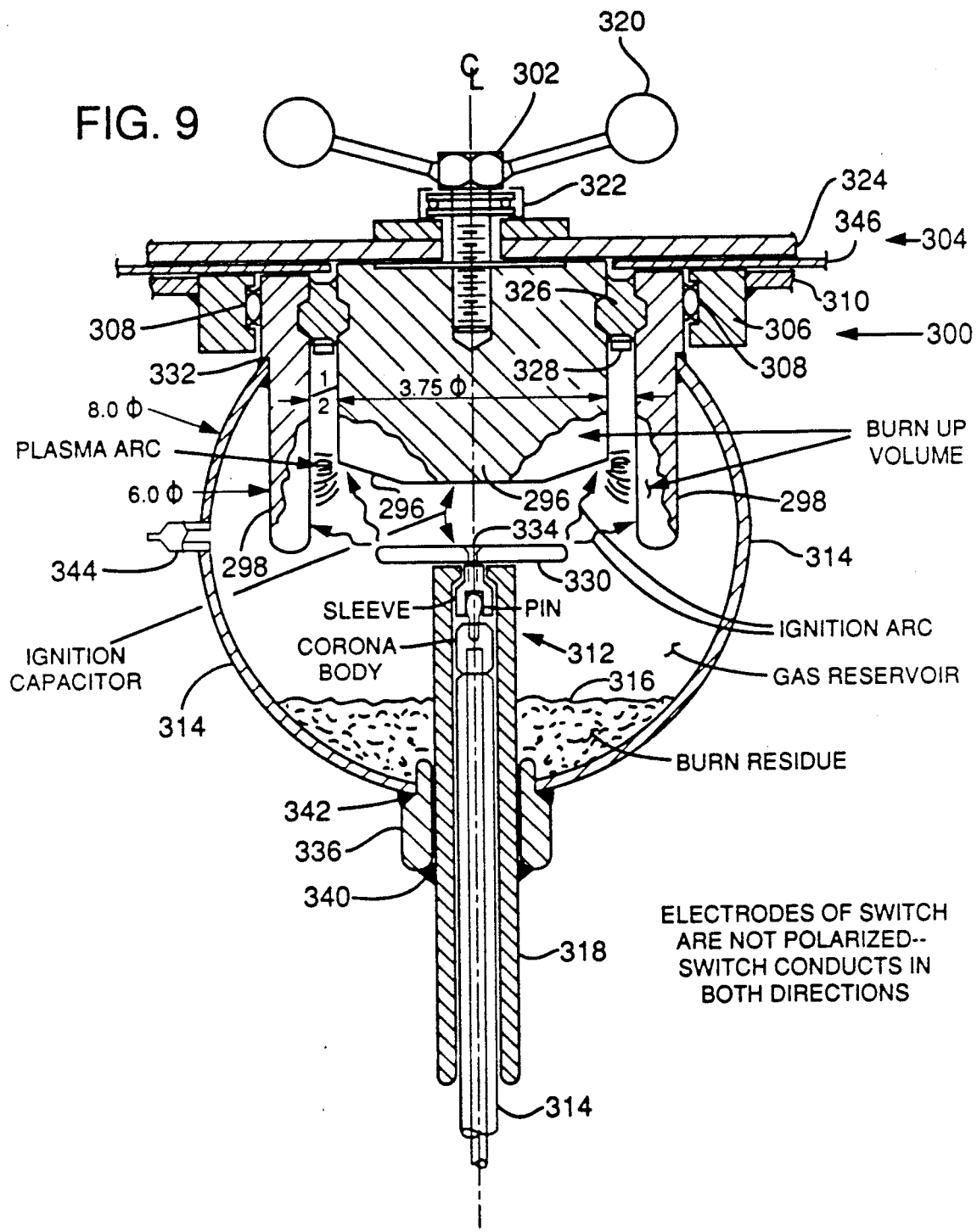
FIG. 9 is a sectional view illustrating another embodiment of a switch in accordance with the invention. The switch of FIG. 9 is coaxial and includes a number of features which produce a long service life.

IX. Coaxial Plasma Switch for Higher-Current Operation and for Self Interrupting Discharge Circuit (Specially Suited for High Flow Machines and Plasma Compression Chamber Operation) (FIG. 9)

The rail gap construction 260 above has an insertion and built-in self inductance of approximately 12 nanohenries. This is more than adequate with the operation of the small liquid processing system of the invention, and even in systems quite larger than that illustrated in the drawing. Also, several of these rail gaps can be used in parallel.

For the use of very-high current systems, especially the ones requiring fast risetimes such as necessary for theta pinch operation, the rail gap inductance is still somewhat high.

Therefore, another plasma switch of the invention has been developed that uses a coaxial design throughout, and its insertion loss into a parallel plate transmission line and its self-inductance is only about three nanohenries. This is shown in FIG. 9.

The electrodes 296 and 298 of this coaxial plasma switch 300 are very massive; about 10 pounds of the electrode material can be burned up before the electrodes have to be replaced, and the physical arrangement is such that, as in the case of the easily serviceable rail gap, no technically skilled personnel is required and the exchange of the electrodes can be done in approximately 15 seconds.

To exchange the burned up parts, all that is required for the embodiment shown is to loosen a contact bolt 302 on the transmission line (generally shown at 304) and drop down the old device. A new unit can be inserted in its place, pulled up against the transmission line contact with the bolt 302, making the contact to the center electrode 296. A contact ring 306 makes contact to the second, ring electrode 298, via spring contacts 308, completing the assembly and the operation can be restarted again. The contact ring 306 is in electrical contact with one flat plate conductor 310 of the transmission line 304. For better heat conduction away from the ring electrode 298 via the contact ring 306, the ring 306 can comprise a split design which is tightly pulled onto the ring electrode 298, with appropriate contact made to the plate 310 (not shown).

The drawing shows the switch 300 with its plug assembly 312 for the ignition cable 314, and a section of transmission line 304 carrying the switch connecting means.

The arc burns in a ring type fashion between the center electrode 296 and the outer ring electrode 298, spreading over the entire inner surface. Ignition occurs at a section in the center of the center electrode, using a fast discharge generator as described earlier; the ignition voltage is equal to or higher than the operation voltage of the plasma switch itself.

The electrode materials can be tungsten or copper-tungsten, if so desired for increased service intervals. However, the ease of replacement of this switch type makes it possible to use ordinary iron as electrode material. If it is run in an inert gas atmosphere, the lifetime is quite adequate.

At a certain current flow, this coaxial switch 300 shows a self-interrupting capability. The magnetic field in the space between the electrodes has a tendency to expand outwardly, and if it is strong enough, it blows out the arc by disconnecting it from the rim of the electrodes.

This feature can be used to shorten the tail end of the discharge pulse that normally would be slowly decaying. However, during that time no more electro-hydraulic action is desired anyway. The shock front has already been generated and has expanded through the liquid and the radiation is no longer necessary.

If the current flow could be interrupted at this point, that remaining energy can be saved in the capacitor bank for the next pulse.

This type of pulse shortening cannot be accomplished by using a rail gap, since the rail gap stays conducting until there is no more current to support the arc. The coaxial switch interrupts itself, if run in the correct operating region. Therefore, no blower need be used, and the switch case can be either filled with inert gas required for its operation (using iron electrodes) and then hermetically sealed off; or it can be connected to an external gas supply to keep it pressurized. By adjusting the gas pressure, the switch insulation resistance can be selected.

There is a further operation mode possible. By setting the gas pressure at a certain value, either at a permanently sealed switch or an externally regulated one, the switch can be self-igniting at a certain operating voltage. Connected to a capacitor bank and to the firing chamber, automatic operation is possible, eliminating the need for the ignition generator altogether.

When the bank voltage has reached its desired value, the switch breaks down, firing the process chamber. At the point of highest current the switch interrupts and the bank starts charging up again from the power supply. This type of operation results in less flexibility in the operation of a general purpose system such as the liquid processing system described, but can be used in the construction of a dedicated system that is laid out for specific operation, such as for a fixed-site sewage treatment plant or mineral recovery plant. Such a system can substantially reduce the amount of energy used, and such systems are also less costly to build.

It is estimated that about 20 to 30 percent of the energy supplied to the firing chamber is not useful but wasted during the current decay, and for a large scale operation the cost savings in energy can be substantial—with the self interruption switch-operation described herein.

Presently there is no other device available that can act as a repetitive fast interrupter for currents in the range between about 300 kiloamperes and one megaampere. Experimentation has been done with photoelectric devices in the high current region, but no useful and inexpensive switch has yet been constructed, particularly as would be suitable for use with the present invention.

The switch case 314, as shown in the drawing, is built as a spherical container large enough to hold a substantial amount of gas and also large enough to accommodate the quantity of residue 316 generated by electrode burnup.

Several of these switches have been built with different electrode materials using tungsten, copper, iron and thoriated tungsten. A process station has been constructed that provides the means to assemble these device, clean them under vacuum conditions and fill the switch cases with purified gases before the cavity is sealed.

The switch 300 shown in the drawing is an example of the remotely triggered coaxial type having very low self-inductance. This type has been built with a switch case diameter of 8 inches and a ring electrode (298) diameter of 6 inches. The switch shown in the drawing is of the permanently sealed type.

The illustrated switch 300 can be exchanged for a replacement switch in a few moments by pulling the ignition cable 314 out of the bushing 318 and loosening the bolt 302 at the top; this is done by turning the attached handle 320.

A ball bearing 322 aids in achieving a good contact between the upper plate conductor 324 of the transmission line and the center switch electrode 296. The other electrode 298 has a sliding contact arrangement with the contact ring 306 and the band of contact making springs 308, as shown and as briefly described above.

In the discharge circuit, the center electrode 296 is the anode and the surrounding electrode 298 is the cathode. The reason for this is that the anode becomes hotter and is cooled by contact with the transmission line plate 324, which in turn can be cooled by air flow against it. The cathode is cooled through the switch case 314, which conducts the heat away and can be forced-air cooled also. For a 30 pulse/second (pps), 200 kiloamperes operation of 4 kilojoules, the heat loss is a few hundred watts, so that simple air cooling is quite adequate.

The switch shorts the transmission-line conductors 310 and 324 to each other when fired.

An epoxy seal 326 is protected from the UV generated by the arc by a ceramic ring 328, but it has been discovered that a mixture of epoxy and alumina powder works as well for the construction of the seal 326, eliminating the need for the ceramic ring 328.

As described earlier, the switch can blow out its own arc, if the magnetic field between the center electrode 296 and the ring electrode 296 is strong enough, causing self-interruption. The field drives the arc downwardly until it is put far enough away from the electrodes that it is extinguished.

Ignition is accomplished by rapidly charging an ignition electrode 330 with high voltage, with the space between the electrodes 330 and 296 acting as a capacitor. When the ignition arc breaks over, this capacitor discharges, giving a strong ignition current, whose rise time is quite fast. This causes an RF pulse that ionizes the gap between the elements 330, 296 and 298 and the power arc jumps over and the switch starts conducting.

As shown in the drawing, much of the electrode material can be burned away and the switch will still operate, because the gap distance remains the same.

A good safe ignition voltage for this operation is about 100 to 150 kilovolts.

The burn residue 316 falls to the lower part of the spherical switch case, where it accumulates as shown in the drawing.

Switches such as shown in the drawing are easily manufactured and refurbished. A solder seal at 332 can be melted as often as desired, and a new electrode pair can be soldered in.

The ignition electrode 330 can be exchanged by unscrewing a small flathead screw 334 in the center of the assembly, but the ignition electrode outlasts many power electrode changes.

The ignition cable 314 may be a stripped coaxial cable of the type RG220-U or similar.

The illustrated switch is held in place by the bolt 302 only, on the transmission line assembly 304.

If it is desired to have greater cooling through the transmission line contact, as stated above the ring 306 can be split and clamped tight against the ring electrode 298, giving good thermal contact at this location.

In this particular switch, the electrodes are made of regular construction steel tubing, and the ignition electrode 330 from SS304.

The switch case 314 is a thin wall stainless steel sphere, nickel plated for solderability. A bushing body 336 at the bottom of the sphere is brass and bushing insulator 318 is polycarbonate which is resistant to UV radiation.

Epoxy is used at 340 as well as at 326. The connections at 332 and 342 are soft solder joints.

Shown at 344 is a copper tube, pinched off after gas fill.

The transmission line 304 can be constructed of plated steel or aluminum; it is desirable to use heavy material, since during the discharge the electromagnetic forces have a tendency to separate the two conductors. A dielectric at 346 in the transmission line is polycarbonate sheet; in the case of a 20 kilovolt firing chamber operation, ⅛ inch material is used.

This type of coaxial switch can switch 500 kiloamperes at 30 pulses/second with the switch used alone; but it is better to use a number of the switches in parallel, since the switches ganged in parallel will produce an increase in the lifetime of the switches that is significantly greater than a succession of single switches used alone. In other words, additional switch lifetime can be realized by spreading the switched charge out among a number of separate switches, at each firing. The reduced stress on each switch increases its lifetime in a manner approximating an exponential function.

X. Operation of Machines in Parallel (FIG. 10)

Figure 10:
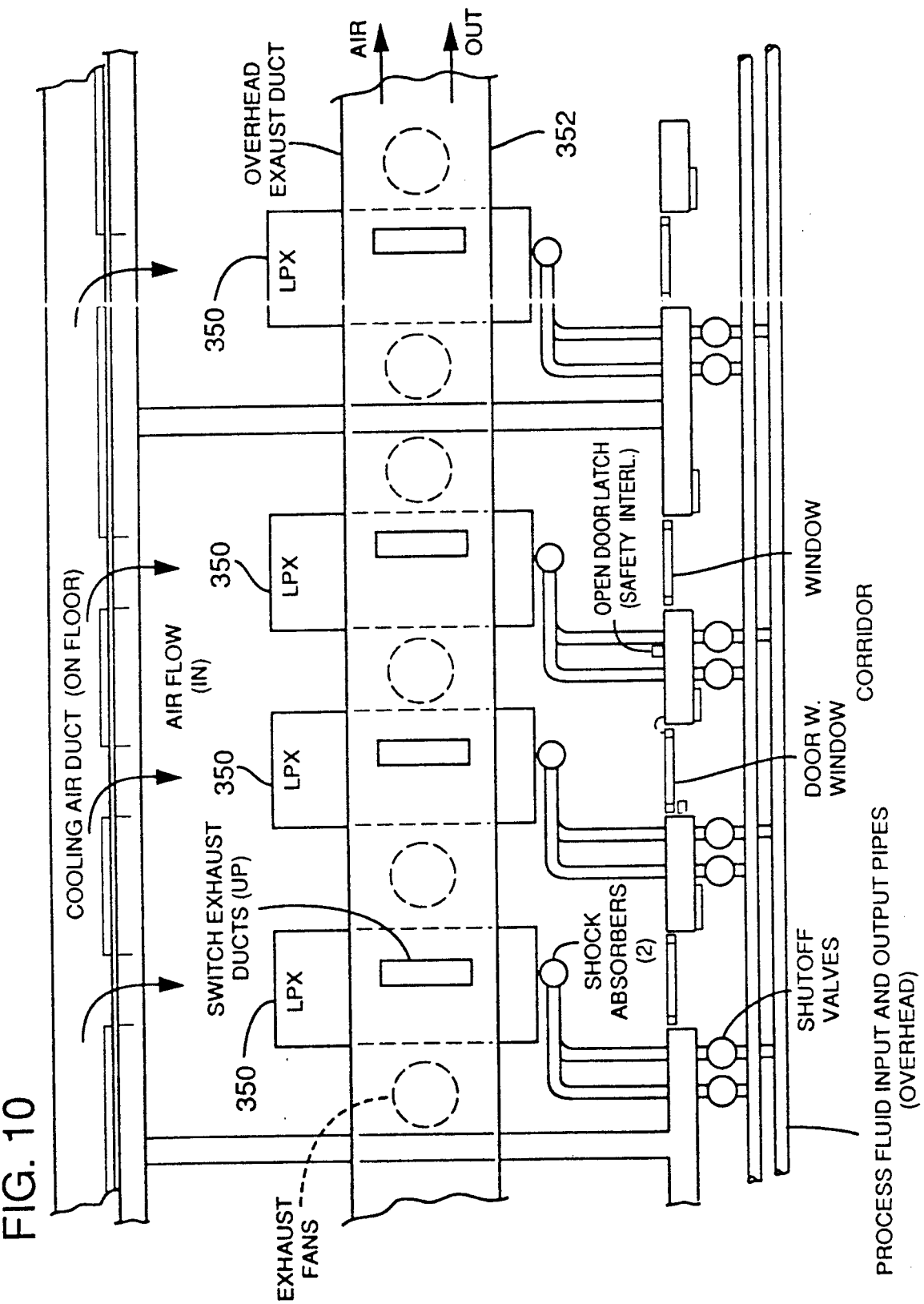
FIG. 10 is a schematic plan view showing a number of electro-hydraulic units of the invention arranged in parallel, for input and output of processed fluid and cooling air.

Operation of the liquid processing system as a modular concept for the building of medium size processing plants is illustrated in the drawing of FIG. 10. (Such a system may handle from about 50,000 gallons/day to about 1 to 2 million gallons/day. For higher flow rates, machines using the larger, opposed-electrode type firing chamber are more energy efficient, but such systems are also more costly to construct.

The liquid processing system of the invention is an open frame construction with exposed wiring, and high voltage components.

The system has to be operated in an enclosed area (for safety considerations; and access should not be possible while the machine is under operation or while any of the capacitors are still charged after shut down). A safety system has been designed (not described herein) that automatically locks out access and shuts the machine down if personnel access is required.

The operational controls are located away from the machines on remote control panels, located outside the machine room.

Up to three machines can be located inside a cubicle. As shown in the drawing, which is a top plan view, the various pipes and cables that manifold all machines 350 together run lengthwise through all cubicles; all machines are run in parallel.

Exhaust (air from switches and cooling air) is conducted through a central duct 356, collecting discharge air from all cubicles.

XI. Narrow Band Operation; Resonating Chamber; Catalytic Operation; Laser Irradiation; Transducer-Induced Shock Waves; Self-Breakdown of Arc Lamp (FIG. 11)

A significant part of the operation's cost of an electrohydraulic system results from the need to replace machine parts frequently.

The firing chamber electrodes as well as switch electrodes have a high specific current load (amperes/surface area), since the discharge currents are quite high.

Also, it seems desirable to be able to selectively excite certain electrical bonds between molecules or atoms by tuning the light frequency to just these excitation frequencies. This need comes not so much into play for the use of this method in the wastewater/water sterilization or mineral recovery area, where a wide spectrum of compounds might want to be excited. Selectivity might be desirable, however, in the event that the mixture of chemical compounds dissolved in the process liquid would give rise to unwanted reactions, if all chemical compounds are indiscriminately broken down at the same time. Also, in the catalysis of reactions one might selectively want to excite certain chemical bonds, but not others.

If that can be achieved, a lot of energy can be saved in the process, since only the type of radiation really required would have to be supplied.

A processing chamber that is based on that principle is described herein. The turbulence (believed to be necessary) in the chamber (for the formation of larger particles of the precipitated insoluble compounds), and the excitation radiation are supplied separately and coupled into the processing chamber.

Even if wide band radiation from an electrical discharge not taking place within the firing chamber is supplied, the problems of material loss from the process chamber walls due to electrolytic transportation can be avoided, making the device last longer.

Also, by using certain elements in the discharge arc even with a simple discharge lamp, matching of wavelength could be achieved. If coherent light (laser source) is used, selective photolytic processing is possible.

To achieve the required intensities, the discharges are pulsed as before and synchronized with the shock wave generator (transducer). A suitable transducer can be constructed from a stack of piezoelectric plates, that are coupled to a capacitive discharge machine. This is done to avoid the high excitation voltages, as would be required for a single crystal possessing equal electrostrictive parameters.

The processing chamber can be made from a high Q material such as quartz or sapphire, so that any shock wave energy not used can be coupled back into the transducer in phase, and no energy is wasted.

Another important feature is the possibility that flat wave fronts can be used, giving uniform processing conditions throughout the entire liquid volume, and the dimensions of the processing chamber can be tailored to the reaction wanted; i.e. the useful depth in which the radiation is still active (depending on the optical absorption of the process material).

Such a "solid state" processing chamber (or cell) would greatly increase the operating efficiency of the system and would have a lifetime that might be indefinite.

One feature of the internally driven firing chamber (as described earlier) is that, in the case of water based processed fluids at least, it is always electrically conductive. That is the reason why the energy from the storage bank has to be switched into the chamber using a separate switch.

In the case of a separate light source, that would run in an (inert) gas atmosphere instead of conducting liquid, the need for a separate switch is eliminated, if the discharge lamp is triggered when the energy bank reaches its desired charge.

There are many designs and variations possible, using different discharge lamp configurations, piezoelectric or magnetic transducers, laser excitation or X-ray irradiation. Only the basic idea of separate generation of irradiation energy and turbulence and their coupling into a resonating process chamber is discussed here.

The accompanying drawing of FIG. 11 shows one device possible, where the process volume 400 is enclosed by a transparent envelope 402 and irradiated from the outside (radially). Piezoelectric transducers 404 supply sonic energy into the volume (axially). Shown on the drawing is approximately one-half of the unit; it is symmetrical about X and Y axes.

The piezoelectric stack 404 is backed up by a (resonating) mass 406 which acts as a reflector of the sonic waves also. This unit 406, depending on wave requirements, can be made from a solid piece (of high Q material), or a stack of quarter wave plates (having different sonic propagation speeds) can be used (not shown), acting as a sonic multilayer mirror, for the shock wave fronts.

The entire assembly is held together by a frame, a portion of which is shown at 408, that preloads the components with a mechanical force to prevent separation of the components.

Each transducer stack 404 comprises a solid, integrated unit by itself, fabricated from wafers of quartz; lithium niobate, lithium tantalate or ceramics can be used, but quartz has been used in experiments. The plates (cut in the "X" crystal axis direction) are deposited with silver alloy for conductivity and mechanical strength, then stacked and melted together under vacuum and applied pressure. (An assembly station has been constructed for this purpose.)

The electrical connections 410 are made on the sides of the stack 404. The rest of the components of the processing assembly are held in place just by the pressure exerted by the frame 408, which balances the hydrostatic pressure in the process chamber via the spherical alignment bearing 412 (hydraulic bearing) and 414 (bearing shell). This bearing-assembly is designed to allow the transducer-lens-unit to be tilted in any direction by approximately 1½° of arc and then clamped into place.

The illumination source is built around the chamber and is liquid cooled from both sides (416, 402). Process fluid cools the inside (via inlets/outlets 426 and manifolds 428), and the outside is water cooled using heat sinks 416.

Since the lamp electrodes 430 (16 pieces for 8 lamp-assemblies) are fed into the arc chamber 431 for longer service intervals (feed mechanism not shown), burnup products must be carried away. Therefore, a flowing (recirculating) gas process is used (gas inlets/outlets 418 conduct gas into/out of the chamber).

The window 402 and the mirrors (eight pieces) 420 have to be kept clean from burn products and the geometry of the discharge space and the gas flow (recirculated) accomplish this. The gas is directed along the envelope of the window 402 and mirrors 420 (8 pieces) by a gas deflection plate/radiation shield 422. The gas flow is along the surfaces of these elements, and particles are drawn into the flow and carried out of the chamber.

The assembly as shown can basically operate in any kind of pulse or CW mode, depending on the requirements of the chemicals to be processed.

It also should be pointed out that, depending on the optical line widths required, the discharge gas and the gas pressure can be chosen as appropriate. A higher gas pressure can be used to give a broadband discharge, while a narrow band operation can be accomplished by using low gas pressure (in combination with metal vapors for certain spectral lines if required).

A further feature of this embodiment lies in the arrangement of the transducers with respect to each other.

The transducers 404 transmit the sonic energy via a lens 424 that has a corrective curvature (drawn exaggerated in FIG. 11) incorporated on the contact surface with the process liquid (as shown), or between two sections having different wave propagation speeds (not shown). This surface is shaped in such a way that the reflected waves coming back from the opposite lens surface (on the other side of the envelope 402) coincide with the transmitted wave after a number of cycles, spatially.

If both transducers (top and bottom as viewed in FIG. 11) are driven in phase, then the piezoelectric stacks 404 can induce a sonic standing wave into the process volume, consisting of a number of nodes.

The processing of the fluid can be done at elevated hydrostatic pressure (which helps conduction of the wave through the liquid), in which the static pressure applied to the bottom of the resonating mass 406 is canceled by the hydrostatic pressure of the fluid in the space 400. The frame 408 balances the forces. By using this method (of generating standing waves and of biasing the pressure by accurately aligning the transducers/lens assemblies toward each other with bearings 412 and 414) the case can be avoided wherein the transducer assembly can undergo high negative pressure anywhere within itself and therefore very high wave front pressures can be transmitted into the liquid without creating a rarefaction zone in the transducer/lens/-resonating mass assembly, which would destroy the unit. Hydrostatic biasing in the embodiment shown might be a few tens of thousands of psi, while the wave front pressures may reach a few hundreds of thousands of psi. The lens and transducer material cannot be overloaded, of course, but a sapphire lens should be able to withstand at least 1 to 1½ million psi surface pressure.

As far as processing energy is concerned, the hydrostatic biasing does not require any energy, the fluid is brought up and down in pressure via a pump driven by its own pressure against the other side of its piston. Only initial pressure has to be supplied, and some energy to make up for friction losses.

The liquid manifold 428 is bolted to the hydraulic frame 408 (connection not shown). Shown at 432 are the electrical connections to capacitors (eight pieces—not shown), and at 434 is seen a sliding contact spring for the electrodes 430. A fluid connection 436 is shown for the hydraulic biasing pressure into the bearing 412. A flexible ring 438 is soldered to the resonating mass 406 that holds the transducer assembly (424, 404, 406) at the correct position within manifold and bearing. The ring 438 provides for slight axial movement of the transducer assembly, which in the case of a standing wave setup in the liquid volume, would have a tendency to locate itself at a point of minimum pressure with respect to the nodes in the liquid.

This self locating feature helps in the alignment and correct operation of the unit (under the condition of wandering of operating frequency), since it is a self stabilizing feature that minimizes material stress on the surface most likely to undergo erosion.

The transducer driven processor shown in FIG. 11 may have an inside diameter (of the envelop 402) of four inches and an overall diameter of about 19½ inches from heat sink to heat sink (416). It may be designed to process 150 thousand gallons per day and would have an approximate power consumption of 60 to 75 kilowatts, depending on the excitation necessary for processing different types of liquids.

Dimensions are shown (in inches) in some of the drawings discussed above; these dimensions should be understood as examples only, for the exemplary process throughput rates discussed in connection with some of the figures, and to show relative sizes, radii of curvature, etc. of various components. The dimensions are not to be taken as limiting the invention to any particular size. Also, the terms "up," "down," "above," "below," etc. are intended only as references for understanding the subject matter of the drawings, and not as limiting with respect to circulation of system assemblies or components of the invention, since nearly all components can be in different orientations from what is shown.

The above described preferred embodiments illustrate the principles of the invention but are not intended to limit the scope of the invention. Variations to these embodiments will be apparent to those skilled in the art and may be made without departing from the scope of the following claims.

I claim:

1. A liquid processing apparatus for treating liquids containing dissolved or undissolved substances in an endothermic photochemical process wherein a high-intensity shock wave is induced in the liquid along with a discharge of light energy into the liquid, comprising:
    a liquid processing chamber having an inlet and an outlet for process liquid,
    transducer means for receiving electrical energy and outputting mechanical vibrations, adjacent to the liquid processing chamber, and coupling means for mechanically coupling the vibrations of the transducer means into the liquid as shock waves in the liquid processing chamber,
    amplification means for amplifying the shock waves in the processing chamber by reinforcement of waves to produce a standing shock wave in the process liquid, with means for tuning the amplification means to produce the standing wave pattern,
    wave front correction means associated with said coupling means for adjusting any significant curvature in the waves produced by the transducer means to a generally flat, planar wave front shape, and
    lamp means for sending high-intensity pulses of light energy into the process liquid in the processing chamber, timed with occurrence of said standing shock wave.

2. The liquid processing apparatus of claim 1, wherein the lamp means comprises a plurality of arc discharge lamps disposed around the processing chamber, with transparent chamber walls between the processing chamber and the lamps.

3. The liquid processing apparatus of claim 1, wherein the transducer means comprises two opposed transducer assemblies on opposite sides of the liquid processing chamber, and wherein said amplification means comprises means in each transducer assembly for reflecting back the shock wave propagated from the opposite transducer assembly and for reinforcing the reflected wave with an in-phase wave from the transducer assembly reflecting the wave, so that high-intensity shock waves are built up in the chamber.

4. The liquid processing system of claim 3, wherein the amplification means includes tuning means for tuning one of the transducer assemblies to match phase with waves being reflected and returned by said one transducer assembly by shifting the phase of the vibrations of the transducer assembly until the strength of the standing wave is maximized.

5. The liquid processing system of claim 4, wherein the transducer assemblies each comprise a stack of piezoelectric transducers.

6. The liquid processing system of claim 1, wherein the transducer means comprises a stack of piezoelectric transducers.

7. The liquid processing system of claim 1, including means for pressurizing the process liquid in the liquid processing chamber, to a pressure at least about 10,000 psi.

8. The liquid processing system of claim 1, further including alignment means connected to the transducer means, for enabling precise alignment of the transducer means with respect to the liquid processing chamber.

9. The liquid processing system of claim 8, wherein the alignment means comprises a spherical mounting having means for swiveling the transducer means in a full range of X-Y alignment motion.

10. The liquid processing system of claim 1, wherein the transducer means includes a stack of shock wave reflecting plates, each reflecting a portion of the total wave energy being reflected.

* * * * *